US011942841B2

United States Patent
Kano et al.

(10) Patent No.: US 11,942,841 B2
(45) Date of Patent: Mar. 26, 2024

(54) STATOR OF ROTARY ELECTRIC MACHINE AND ROTARY ELECTRIC MACHINE

(71) Applicants: KABUSHIKI KAISHA TOSHIBA, Tokyo (JP); TOSHIBA INFRASTRUCTURE SYSTEMS & SOLUTIONS CORPORATION, Kawasaki (JP)

(72) Inventors: Masaru Kano, Yokkaichi (JP); Hidenori Uchida, Mie (JP)

(73) Assignees: KABUSHIKI KAISHA TOSHIBA, Tokyo (JP); TOSHIBA INFRASTRUCTURE SYSTEMS & SOLUTIONS CORPORATION, Kawasaki (JP)

( * ) Notice: Subject to any disclaimer, the term of this patent is extended or adjusted under 35 U.S.C. 154(b) by 380 days.

(21) Appl. No.: 17/382,482

(22) Filed: Jul. 22, 2021

(65) Prior Publication Data

US 2021/0351649 A1 Nov. 11, 2021

Related U.S. Application Data

(63) Continuation of application No. PCT/JP2020/009487, filed on Mar. 5, 2020.

(51) Int. Cl.
H02K 3/12 (2006.01)
H02K 1/16 (2006.01)
(Continued)

(52) U.S. Cl.
CPC ............... *H02K 3/12* (2013.01); *H02K 1/16* (2013.01); *H02K 1/276* (2013.01); *H02K 3/28* (2013.01)

(58) Field of Classification Search
CPC ...... H02K 1/276; H02K 1/16; H02K 2203/15; H02K 3/522; H02K 1/165; H02K 3/28; H02K 3/14; H02K 3/12
(Continued)

(56) References Cited

U.S. PATENT DOCUMENTS 5,721,188 A 2/1998 Sung et al.
6,657,352 B1 12/2003 Asao et al.
(Continued)

FOREIGN PATENT DOCUMENTS

EP 2237391 A1 10/2010
EP 3614535 A1 2/2020
(Continued)

OTHER PUBLICATIONS

International Search Report dated Jun. 2, 2020 in PCT/JP2020/009487, filed on Mar. 5, 2020, 3 pages
(Continued)

*Primary Examiner* — Terrance L Kenerly
(74) *Attorney, Agent, or Firm* — Maier & Maier, PLLC

(57) ABSTRACT

According to one embodiment, a stator includes a stator core and coils having a rectangular cross-section. In one or more slots, a first rectangular conductor, which is positioned innermost in a radial direction and in which a pair of short sides in a cross section face in the radial direction, and a second rectangular conductor, which is positioned outer side of the radial direction than is the first rectangular conductor and in which a pair of long sides in the cross-section face in the radial direction, are disposed. The first rectangular conductor includes a bending part bent toward a circumferential direction. The second rectangular conductor includes a bending part bent toward the circumferential direction and a twisted part twisted about the circumferential direction.

8 Claims, 13 Drawing Sheets

(51) Int. Cl.
*H02K 1/276* (2022.01)
*H02K 3/28* (2006.01)

(58) Field of Classification Search
USPC .......................................... 310/179, 201, 208
See application file for complete search history.

(56) References Cited

U.S. PATENT DOCUMENTS

| | | | |
|---|---|---|---|
| 2010/0026132 | A1 | 2/2010 | Ooiwa et al. |
| 2011/0012471 | A1 | 1/2011 | Dang et al. |
| 2012/0274172 | A1 | 11/2012 | Koga |
| 2021/0273537 | A1 | 9/2021 | Toshiba et al. |

FOREIGN PATENT DOCUMENTS

| | | | |
|---|---|---|---|
| JP | 59-63945 | A | 4/1984 |
| JP | 2-91474 | U | 7/1990 |
| JP | 2001-186729 | A | 7/2001 |
| JP | 2003-18778 | A | 1/2003 |
| JP | 2008-200675 | A | 9/2008 |
| JP | 2009-95193 | A | 4/2009 |
| JP | 2010-35381 | A | 2/2010 |
| JP | 2010-41795 | A | 2/2010 |
| JP | 2011-72052 | A | 4/2011 |
| JP | 2014-23171 | A | 2/2014 |
| JP | 2014-36560 | A | 2/2014 |
| JP | 2014-217227 | A | 11/2014 |
| JP | 2015-233414 | A | 12/2015 |
| JP | 6003314 | B2 | 10/2016 |
| JP | 2018-170881 | A | 11/2018 |
| JP | 6606311 | B1 | 11/2019 |
| JP | 2020-156197 | A | 9/2020 |
| JP | 6892473 | B2 | 6/2021 |

OTHER PUBLICATIONS

Extended Search Report dated Nov. 2, 2023, in corresponding European Application No. 20913087.1, 11 pages.

STATOR OF ROTARY ELECTRIC MACHINE AND ROTARY ELECTRIC MACHINE

CROSS-REFERENCE TO RELATED APPLICATIONS

This application is a Continuation Application of PCT Application No. PCT/JP2020/009487, filed Mar. 5, 2020, the entire contents of which are incorporated herein by reference.

FIELD

Embodiments described herein relate generally to a stator of a rotary electric machine and a rotary electric machine.

BACKGROUND

A rotary electric machine includes a cylindrical stator and a rotor attached rotatably to a field space of the stator. The stator includes a stator core which is multi-layered electromagnetic steel plates in a cylinder shape and a coil attached to the stator core (rotor wires formed of rectangular conductors). The rectangular conductor formed of a plurality of coil segments has coil ends projecting from the end surfaces of the stator core in the axial direction. In recent years, a demand for a smaller stator of the rotary electric machine which can maintain its electrical performance is high.

DETAILED DESCRIPTION

Figure 1:
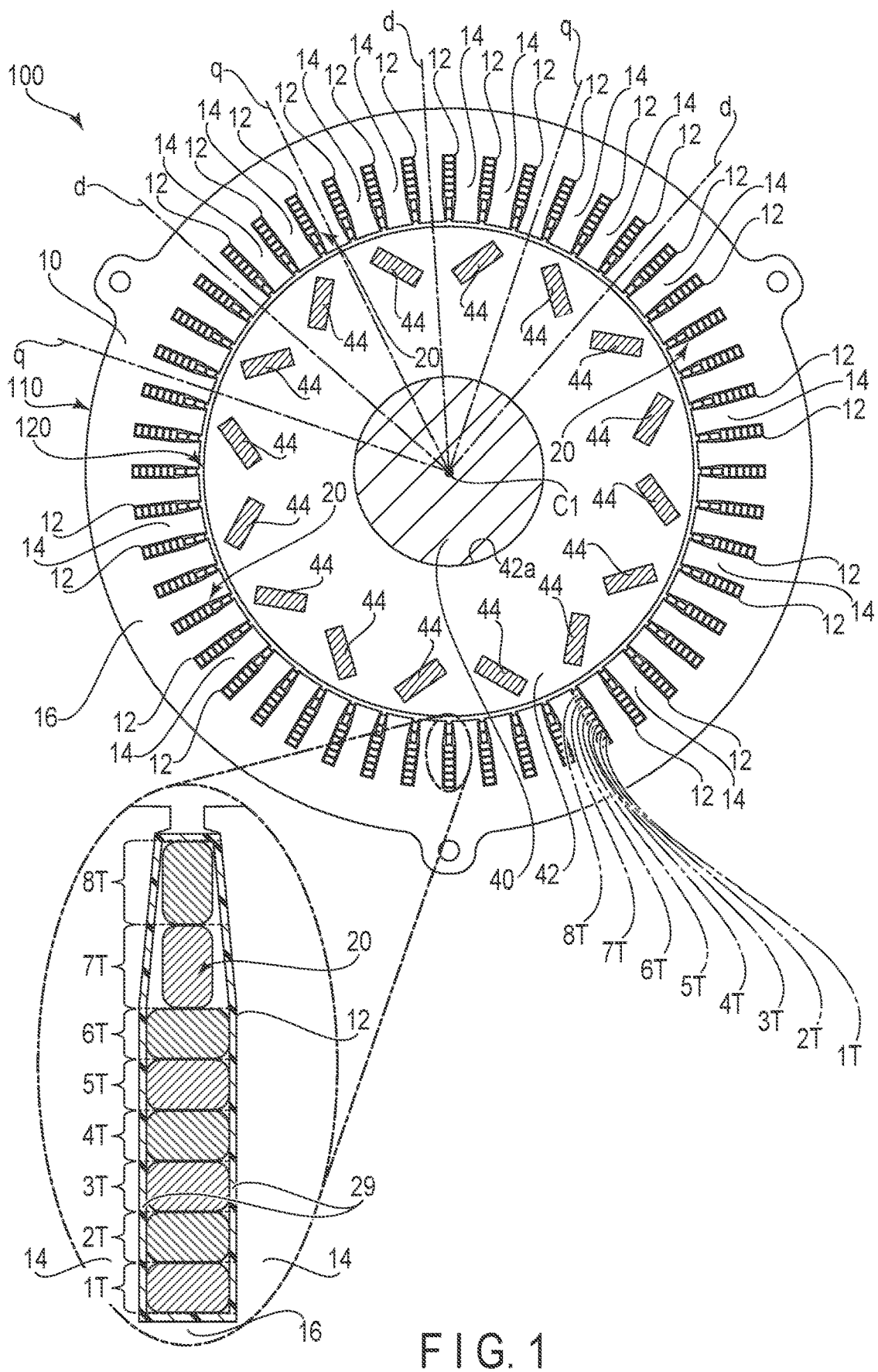
FIG. 1 is a horizontal cross-sectional view of a rotary electric machine of a first embodiment.

Various embodiments will be described hereinafter with reference to the accompanying drawings. In general, according to one embodiment, a stator of a rotary electric machine comprises a stator core including a yoke and a plurality of teeth, and a plurality of rectangular conductors having a rectangular cross-section. The rectangular conductor includes a linear part passing through a slot formed between adjacent teeth. A width of the slot is formed to be narrower to an inner side from an outer side of a radial direction of the stator core. In at least one of the slot, the linear part of a first rectangular conductor of the rectangular conductors, which is positioned innermost in the radial direction and in which a pair of short sides in the cross-section face in the radial direction, and the linear part of a second rectangular conductor of the rectangular conductors, which is positioned outer side of the radial direction than is the linear part of the first rectangular conductor and in which a pair of long sides in the cross-section face in the radial direction, are disposed. The first rectangular conductor includes, in a part drawn from the slot, a bending part extending from the linear part to be bent toward a circumferential direction of the stator core. The second rectangular conductor includes, in a part drawn from the slot, the bending part extending from the linear part to be bent toward the circumferential direction, and a twisted part extending from the bending part to be twisted about the circumferential direction.

It should be noted that the disclosure is merely an example, and changes which are made appropriately while maintaining the gist of the invention and can be easily conceived by a person skilled in the art are naturally included in the scope of the present invention. Further, in order to clarify the explanation, the drawings may schematically represent the dimensions, shapes, etc., of each part as compared with the actual aspects, but they are merely examples and do not limit the interpretation of the present invention. Further, in the present specification and each figure, the same elements as those described above with reference to the figure already referred to may be designated by the same reference numerals, and detailed description thereof may be omitted as appropriate.

First Embodiment

A stator 110 and a rotor 120 of a rotary electric machine 100 will be explained with reference to FIG. 1.

FIG. 1 is a horizontal cross-sectional view of the rotary electric machine 100 of a first embodiment.

As in FIG. 1, the rotary electric machine 100 is structured as a permanent magnetic type, for example. The rotary electric machine 100 includes a cylindrical stator 110 and a rotor 120 provided coaxially with the stator 110 to be rotatable about a center axis line C1 inside the stator 110, and is arranged in a field space of the stator 110.

In the following description, a direction in which the center axis line C1 of the rotary electric machine 100 extends will be referred to as axial direction, a direction to rotate about the center axis line C1 will be referred to as circumferential direction, and a direction orthogonal to the axial direction and the circumferential direction will be referred to as radial direction.

As in FIG. 1, the stator includes, for example, a cylindrical stator core 10 and a coil (rotor wires formed of rectangular conductors) 20 wound around the stator core 10. The stator core 10 includes a yoke 16 and a plurality of teeth 14. The stator core 10 is formed of multiple ring-shaped electromagnetic steel plates 10S such as silicon steel layered coaxially about the center axis line C1. The multiple electromagnetic steel plates 10S are welded at multiple places on the outer peripheral surface of the stator core 10 to be bonded while being layered on each other. The stator core 10 includes, while the multiple electromagnetic steel plates 10S are layered, one end surface 10a positioned at one end in the axial direction and other end surface 10b positioned in the axial direction. The one end 10a and the other end 10b extend to be orthogonal to the center axis line C1. The stator core 10 includes an inner peripheral surface 10c opposed to the rotor 120, and an outer peripheral surface 10d supported by a casing which is not shown.

In the inner peripheral part of the stator core 10, a plurality of (for example, 48) teeth 14 arranged to be apart from each other in the circumferential direction of the stator core 10 are formed. Each of the teeth 14 extends toward the center axis line C1 shown in FIG. 1, and the teeth 14 are arranged along the circumferential direction of the stator core 10 at regular intervals. That is, the stator core 10 integrally includes a ring-shaped yoke 16 positioned in the outer side of the radial direction and the teeth 14 extending in the inner side of the radial direction from the inner peripheral surface of the yoke 16 to the center axis line C1.

In the inner peripheral part of the stator core 10, a plurality of (for example, 48) slots 12 are formed between the teeth 14 adjacent to each other in the circumferential direction of the stator core 10. The width of the slot 12 is formed relatively narrower toward the inner side of the radial direction of the stator core 10. In at least one slot 21, of the coils 20, a first rectangular conductor positioned in the innermost side in the radial direction of the stator core 10 and a pair of short sides of which in the cross-section face the radial direction, and a second rectangular conductor positioned in the outer side in the radial direction than is the first rectangular conductor and a pair of long sides of which face the radial direction are arranged. The rectangular conductor will be explained later.

Each slot 12 includes areas 1T, 2T, 3T, 4T, 5T, 6T, 7T, and 8T in which multiple kinds of coil segments (first coil segment 21 to seventh coil segment 27) are inserted in the axial direction Z and arranged in the radial direction of the stator core 10. In this example, the areas 1T to 8T of each slot 12 are, while being arranged in a ring shape in the circumferential direction of the stator core 10, to structure lanes 1 to 8 of the coil segment as will be described later. Each slot 12 extends from the one end surface 10a to the other end surface 10b of the stator core 10 in the center axis line C1, an is arranged in the circumferential direction of the stator core 10 at a regular interval. Each slot 12 opens on the inner peripheral surface of the stator core 10 and extends in a radiation direction (outward of radial direction) of the stator core 10 from the inner peripheral surface. Each slot 12 extends over the entire length of the stator core 10 in the axial direction Z while one end opens to the one end surface 10a of the stator core 10 and the other end opens to the other end surface 10b of the stator core 10.

Note that, in the present embodiment, each slot 12 opens to the inner peripheral surface of the stator core 10; however, each slot 12 may not open on the inner peripheral surface of the stator core 10. Furthermore, each slot 12 extends in parallel to the axial direction Z of the stator core 10; however, each slot 12 may be inclined with respect to the axial direction Z, that is, may be skewed.

The coil 20 has a rectangular cross-section. Each coil 20 is inserted into each slot 12 and is attached to each of teeth 14 positioned between adjacent slots 12. The coil 20 includes coil segments including a linear part provided with the slot 12 and a bridge part connecting the linear parts of different slots 12 which are bonded together. In each coil segment, the linear part includes a first linear part and a second linear part provided with different slots. The coil 20 includes a plurality of coil segments bonded together, which include a first coil segment and a second coil segment. The first linear part and the second linear part of the first coil segment are arranged in the innermost position in the radial direction of different slots 12. The first linear part and the second linear part of the second coil segment are arranged in the innermost position in the radial direction of different slots 12 which are different from those to which the first coil segment is inserted, while holding the first linear part and the second linear part of the first coil segment from the both sides in the circumferential direction. At least one of the first and second coil segments is included in the first rectangular conductor. The coil segment will be explained later.

Figure 2:
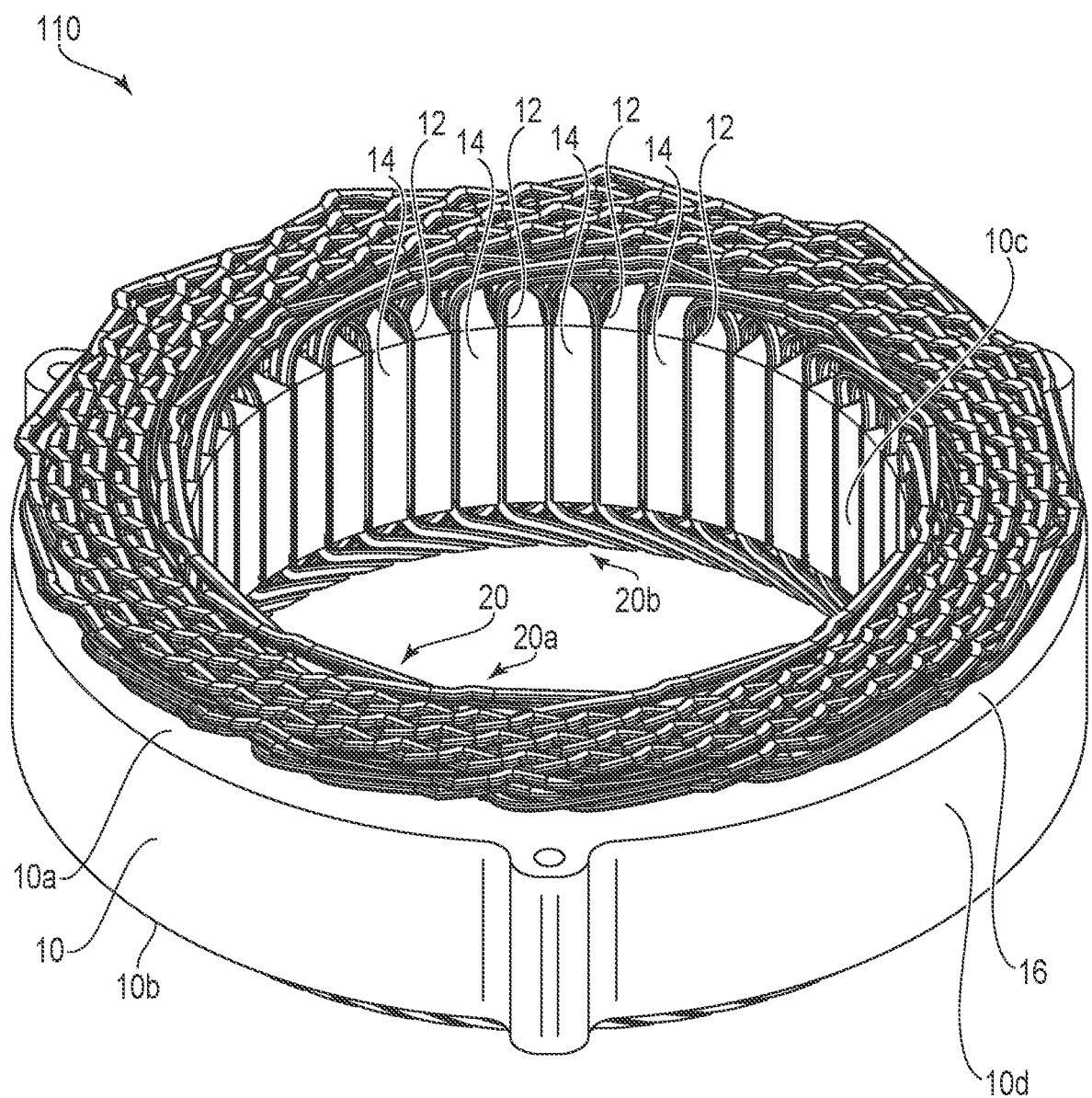
FIG. 2 is a perspective view of a stator, as being viewed from one end surface side of a stator core (non-welding side of each coil segment).
Figure 3:
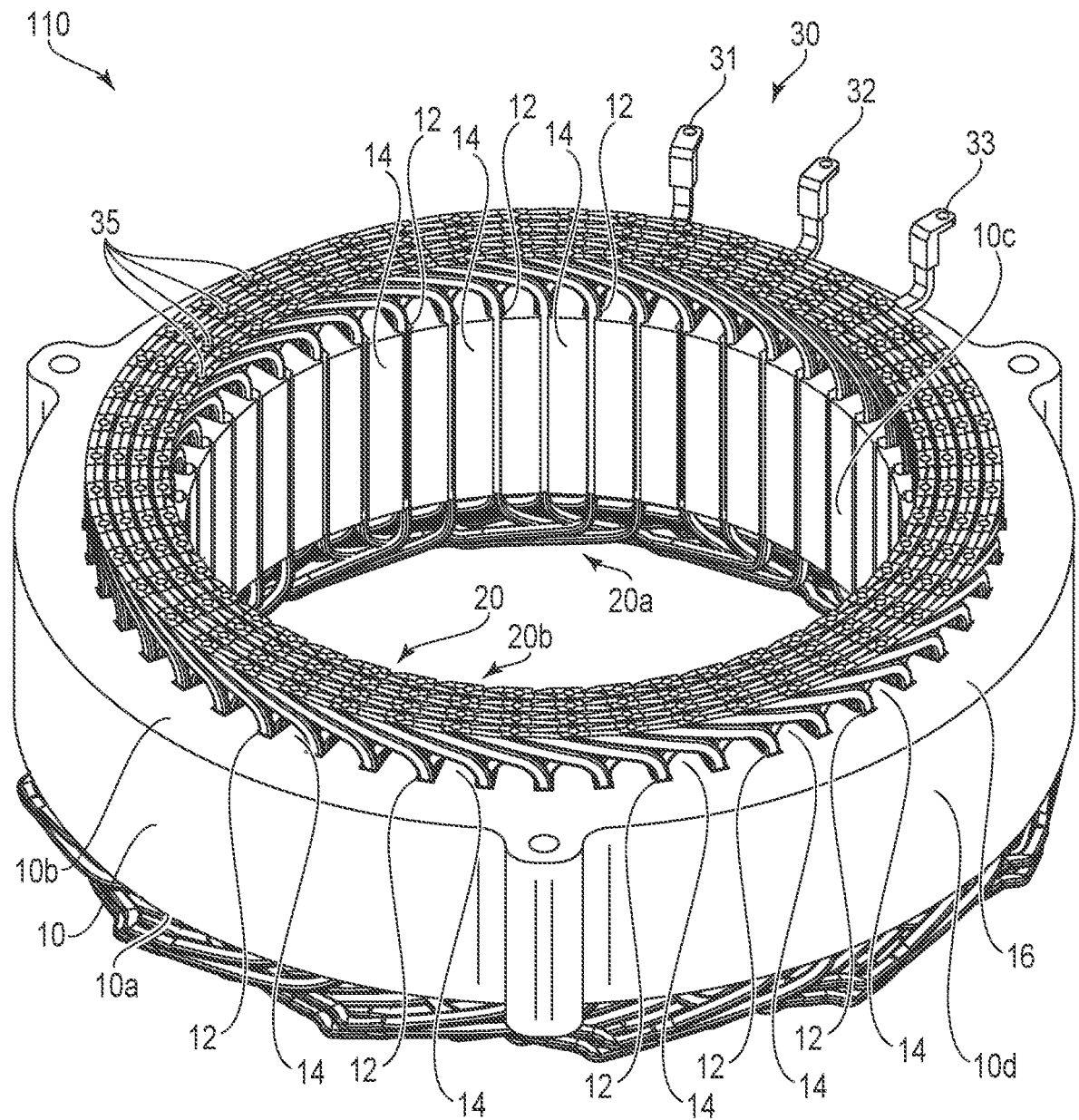
FIG. 3 is a perspective view of the stator, as being viewed from the other end surface side of the stator core (welded side of each coil segment).

As shown in FIGS. 2 and 3, the coil 20 includes a first coil end 20 extending from one end surface 10a of the stator core 10 to the outer side of the axial direction, and a second coil end 20b extending from the other end surface 10b of the stator core 10 to the outer side of the axial direction. Some of the coils 20 include, in the part led from the slot 12, bending parts bent in the circumferential direction of the stator core 10. Furthermore, some of the coils 20 include, in the part led from the slot 12, bending parts bent in the circumferential direction of the stator core 10 and twisted parts twisted about the circumferential direction. The bending parts and the twisted parts will be explained later.

As in FIG. 1, the rotor 120 includes a columnar shaft (rotation axis) 40 rotating about the center axis line C1, cylindrical rotor core 42 passing approximately through the center part of the axial direction Z of the shaft 40, and a plurality of permanent magnets 44 embedded in the rotor core 42.

The rotor core 42 is formed as a lamination body including multiple ring-shaped electromagnetic steel plates 42S formed of a magnetic material such as silicon steel, laminated coaxially. The rotor core 42 includes an inner hole 42a formed coaxially with the center axis line C1. The shaft 40 is inserted into and fitted in an inner hole 42a of the rotor core 42, and the shaft 40 extends from the rotor core 42 to be coaxially with the stator core 10. The rotor core 42 is arranged coaxially with the stator core 10 with a slight gap (air gap) in the stator core 10. That is, the outer peripheral surface of the rotor core 42 is opposed to the tip surface of the teeth 14 corresponding to the inner peripheral surface of the stator core 10 with a slight gap.

The rotor core 42 has an axis d extending in a radiation direction (outer side of radial direction) of the rotor core 42 and an axis q which is electrically apart with respect to axis d at 90°. In the present embodiment, an axis extending radially passing through the boundary of adjacent magnetic poles and the center axis line C1 is given axis q, and an axis which is electrically orthogonal to the axis q is given axis d. Axes d and q are alternately arranged in the circumferential direction of the rotor core 42 periodically. In the rotor core 42, a plurality of holes for the permanent magnets 44 passing through the axial direction Z are formed.

The permanent magnets 44 are embedded and fixed in the holes of the rotor core 42. The permanent magnets 44 extend over the entire length of the rotor core 42 in the axial direction Z, and are arranged in the circumferential direction of the rotor core 42 at certain intervals. Each of the permanent magnets 44 is, in the circumferential direction of the rotor core 42, provided with sides of each axis d. Each permanent magnet 44 is formed such that the cross-sectional shape is a rectangular slender flat plate, has a length which is approximately the same as the length of the rotor core 42 in the axial direction Z. The permanent magnet 44 is, when being viewed in a cross-sectional surface orthogonal to the center axis line C1 of the rotor core 42, inclined with respect to the axis d. Two permanent magnets 44 provided with respect to the axis d are arranged in a V-letter shape. In this example, the inner peripheral side ends of the permanent magnets 44 are adjacent to the axis d and are opposed to each other with a slight gap therebetween. The outer peripheral side ends of the permanent magnets 44 are apart from the axis d along the circumferential direction of the rotor core 42, and are positioned in the proximity of the outer peripheral surface of the rotor core 42 and the axis d. Thus, the outer peripheral side ends of the permanent magnets 44 are adjacent to the outer peripheral side ends of the permanent magnets 44 of adjacent magnetic pole with the axis q interposed therebetween.

Note that, in the embodiment, each permanent magnet 44 is inclined with respect to the axis d; however, each permanent magnet 44 may not be inclined with respect to the axis d.

The rotary electric machine 100 is driven by three-phase (U, V, and W phases) alternating current power. For example, two parallel-connected coils 20 corresponding to U phase, two parallel-connected coils 20 corresponding to V phase, and two parallel-connected coils 20 corresponding to W phase are wound around the teeth 14 in a distribution arrangement. That is, six parallel-connected coils 20 in total corresponding to U, V, and W phases are wound around the teeth 14. Here, of the 48 slots 12 arranged in the circumferential direction of the stator core 10, two coils 20 of U phase is arranged in n-th (n-th is not shown, the same applies in the following description) and n+1-th slots 12 with reference to an optional slot 12. Note that n is 1, 6, 12, 18, 24, 30, 36, and 42. Similarly, of the 48 slots 12, two coils 20 of V phase are arranged in n+2-th and n+3-th slots 12. Similarly, of the 48 slots 12, two coils 20 of W phase are arranged in n+4-th and n+5-th slots 12. In each slot 12, eight coil segments in total are arranged such that the long sides thereof are parallel to the radial direction of the stator core 10.

With reference to FIGS. 1 to 4, the outline of the coils 20 of the stator 110 will be explained.

Figure 4:
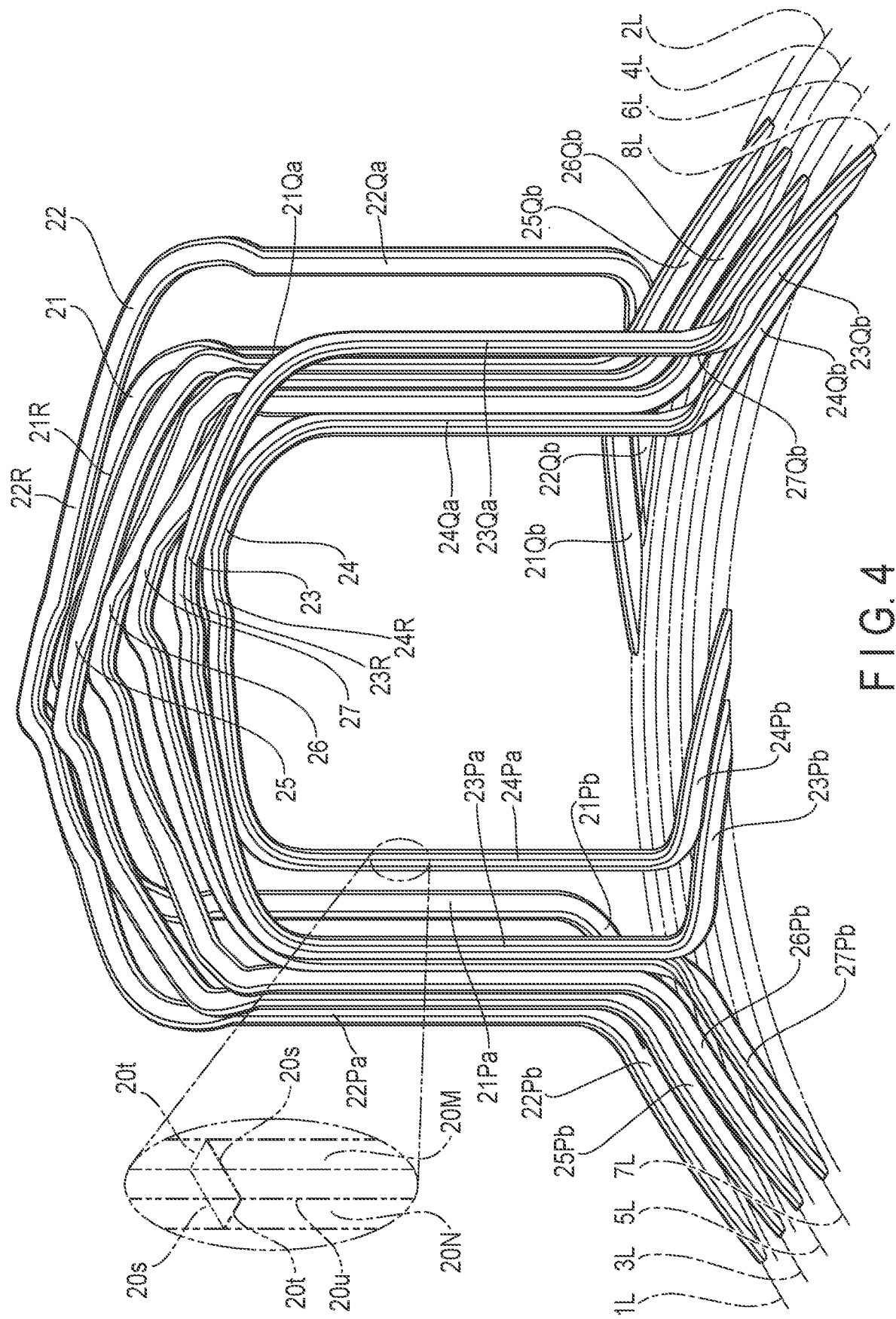
FIG. 4 is a perspective view of first to seven coil segments inserted in a slot of the stator core.

FIG. 2 is a perspective view of a part of the stator 110 of the rotary electric machine 100 as being viewed from the one end surface 10a side of the stator core 10 (non-welded side of each coil segment), FIG. 3 is a perspective view of a part of the stator 110 of the rotary electric machine 100 as being viewed from the other end surface 10b side of the stator core 10 (welded side of each coil segment), and FIG. 4 is a perspective view of first coil segment 21 to seventh coil segment 27 inserted into the slots 12 of the stator core 10.

FIG. 1 illustrates a plurality of areas defined in the inside of the slot 12 from the outer side to the inner side of the radial direction of the stator core 10, including areas 11 (outermost area in slot 12), 2T, 3T, 4T, 5T, 6T, 7T, and 8T (innermost area in slot 12). In each area, the coil 20 is inserted.

FIG. 4 illustrates lane 1 (outermost peripheral lane), lane 2, lane 3, lane 4, lane 5, lane 6, lane 7, and lane 8 (outermost peripheral lane) of the coil 20 corresponding to areas 1T, 2T, 3T, 4T, 5T, 6T, 7T, and 8T of each slot 12 arranged in the circumferential direction of the stator core 10, as 1L, 2L, 3L, 4L, 5L, 6L, 7L, and 8L. In this example, for example, a virtual circle connecting each area 11 of 48 slots 12 arranged in a ring-shape in the circumferential direction of the stator core 10 will be referred to as lane 1 of the coil 20. Similarly, for example, a virtual circle connecting each area 8T of 48 slots 12 will be referred to as lane 8 of the coil 20.

As shown in FIGS. 2 and 4, in the one end surface 10a side of the stator core 10, the first coil 20 of each of phases (U, V, and W phases) includes a first coil segment 21 arranged in the area 1T (corresponding to the outermost peripheral lane 1) of each slot 12, fifth coil segment 25 arranged between the areas 2T and 3T (lane 2 and lane 3) of each slot 12, sixth coil segment 26 arranged between areas 4T and 5T (lane 4 and lane 5) of each slot 12, seventh coil segment 27 arranged between the areas 6T and 7T (lane 6 and lane 7) of each slot 12, and third coil segment 23 arranged in the area 8T (the innermost peripheral lane 8) of each slot 12.

The second coil 20 of each of phases is connected to the first coil 20 in an electrically parallel manner. The second coil 20 of each of phases is formed of the second coil segment 22 inserted in the area 1T of each slot 12, fifth coil segment 25, sixth coil segment 26, seventh coil segment 27, and fourth coil segment 24 inserted in the area 8T of each slot 12.

As shown in FIGS. 3 and 4, in the other end surface 10b side of the stator core 10, in the first coil 20 of each of phases, the first coil segment 21, fifth coil segment 25, sixth coil segment 26, seventh coil segment 27, and third coil segment 23 are welded in this order to form a weld bead 35. Similarly, in the second coil 20 of each of phases, the second coil segment 22, fifth coil segment 25, sixth coil segment 26, seventh coil segment 27, and fourth coil segment 24 are welded in this order to form a weld bead 35. The weld dot 35 is formed of ends corresponding to bonding surfaces of different coil segments adjacent to each other, which are partially melt and cooled to be cured because of, for example, laser beam irradiation.

Now, a connection terminal 30 which is an input terminal of power with respect to the coil 20 includes a U phase connection terminal 31 connected to a lead line of two U phase coils 20, V phase connection terminal 32 connected to a lead line of two V phase coils 20, and W phase connection terminal 33 connected to a lead line of two W phase coils 20. When alternating current is input to the two U phase coils 20 through the U phase connection terminal 31, alternating current is input to the two V phase coils 20 through the V phase connection terminal 32, and alternating current is input to the two W phase coils 20 through the W phase connection terminal 33, a certain interlinkage magnetic flux is formed in the stator 110 (teeth 14).

With reference to FIG. 4, the outline of coil segments (first coil segment 21 to seventh coil segment 27) of the coil 20 will be explained.

As in FIG. 4, the first coil segment 21 to the seventh coil segment 27 are formed of rectangular conductors (corresponding to wire of coil 20) having a perpendicular cross-section (horizontal cross-section) in the longitudinal direction. Each coil segment formed of the rectangular conductors (first coil segment 21 to seventh coil segment 27) is formed in, for example, a rectangular shape with two long sides 20s (first sides) and two short sides 20t (second sides) opposed in the horizontal cross-section. A pair of long sides 20s are opposed to each other in a direction crossing the extension direction of the coil segment. A pair of short sides 20t are shorter than the long sides 20s, and while being crossing the long sides 20s, opposed to each other in a direction crossing the extension direction of the coil segment. Each coil segment includes long side surfaces 20M including the long sides 20s and outer edges 20u extending in the extension direction, which are opposed to each other, and short side surfaces 20N (second side surfaces) including the short sides 20t and outer edges 20u, which are crossing the long side surface 20M and are opposed to each other. In each coil segment, M is added to the end of the reference number if the long side surface (first side surface) is represented, and N is added to the end of the reference number if the short side surface (second side surface) is represented. The four corners of the rectangular conductor in the horizontal cross-section are subjected to the R treatment. The rectangular conductor may be square without performing the chamfering of the four corners thereof or performing any treatment to the four corners thereof. The first coil segment 21 to the seventh coil segment 27 are formed of copper or aluminum which has sufficient conductivity.

In two coils of each of U, V, and W phases, the first coil segment to the seventh coil segment 27 are arranged to be relatively shifted by two units with respect to each of the slots 12 arranged in the circumferential direction of the stator core 10 based on distribution arrangement. That is, of 48 slots 12 arranged from n-th to n+47-th, for example, U phase coils 20 are arranged in n-th and n+1-th slots 12, V phase coils 20 are arranged in n+2-th and n+3-th slots 12 which are relatively shifted by two, and W phase coils 20 are arranged in n+4-th and n+5-th slots 12 which are relatively shifted by two. Note that n is 1, 7, 13, 19, 25, 31, 37, and 43. Two coils 20 of each phase may be arranged in different slots 12 while the connection state between the coil segments (first coil segment 21 to seventh coil segment 27) of the coil 20 is the same. On the other hand, two coils 20 of each phase have different connection states between the first and second coils 20 of the same phase.

The first coil 20 of each of phases structures one line when, in the first coil segment 21 in which a pair of bending parts are bent counter clockwise, fifth coil segment 25, sixth coil segment 26, and seventh coil segment 27 in which a pair of bending parts are bent clockwise and counter clockwise to be apart from each other, and third coil segment 23 in which a pair of bending parts are bent clockwise, bonding surfaces adjacent in the radial direction of the stator core 10 are welded. Note that, in FIG. 4, the first coil segment 21 to the seventh coil segment 27 are shown one-by-one.

The second coil 20 of each of phases structures one line when, in the second coil segment 22 in which a pair of bending parts are bent counter clockwise, fifth coil segment 25, sixth coil segment 26, and seventh coil segment 27 in which a pair of bending parts are bent clockwise and counter clockwise to be apart from each other, and fourth coil segment 24 in which a pair of bending parts are bent clockwise, bonding surfaces adjacent in the radial direction of the stator core 10 are welded.

In the two coils 20 of each of phases, the bonding surface of each coil segment is electrically insulative because of being powder coated or being covered with an insulative material such as varnish, for example. Furthermore, a plurality of coil segments arranged in the same slot 13 are integrally packaged with an insulating paper 29 to be electrically insulative. Each coil segment is inserted in a ring-shaped insulating paper 29 contacting the inner surface of slot 12 as in FIG. 1.

Figure 5:
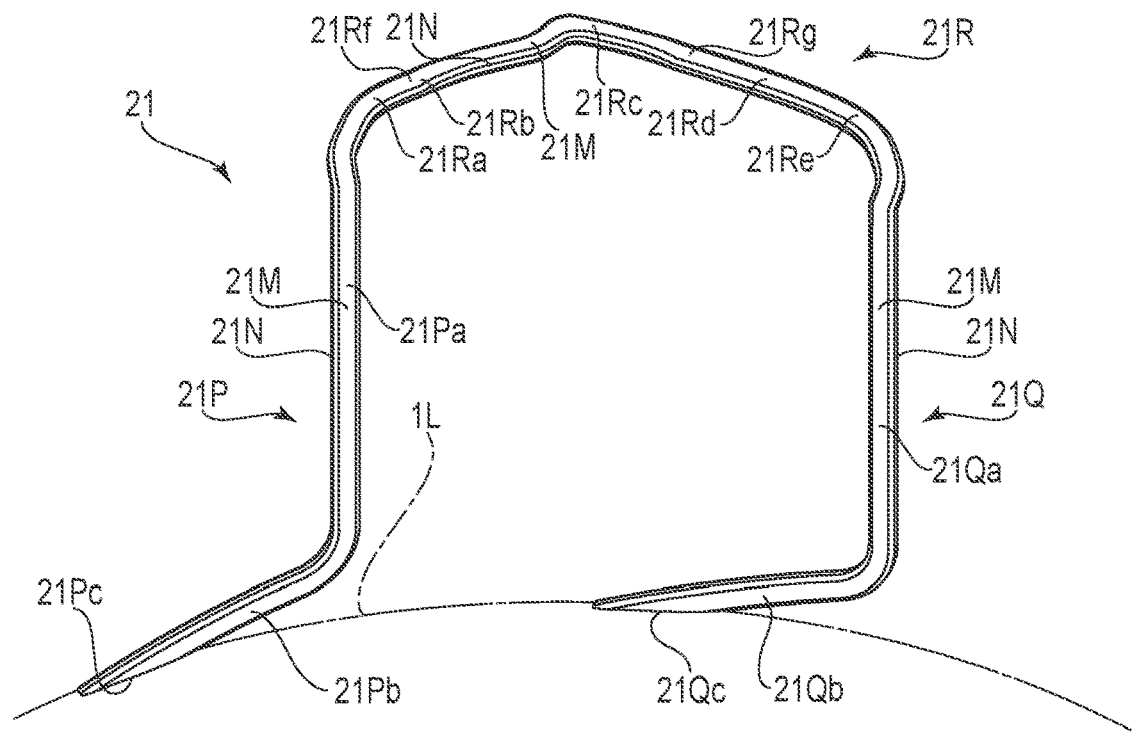
FIG. 5 is a perspective view of the first coil segment positioned in lane 1 (outermost peripheral lane) of the slot.

With reference to FIG. 5, the structure of the first coil segment 21 positioned in the outermost area 1T (lane 1) of the coil segments arranged in the radial direction of the stator core 10 in the slot 12 will be explained.

FIG. 5 is a perspective view of the first coil segment 21 positioned in lane 1 (outermost peripheral lane) of slot 12.

As in FIG. 5, the first coil segment 21 is inserted in the area 1T of two different slots 12. The first coil segment 21 integrally includes a first extension part 21P inserted in the slot 12, and second extension part 21Q inserted in the slot 12 which is five units apart from the slot 12 where the first extension part 21P is inserted in the circumferential direction of the stator core 10 (clockwise as being viewed from the one end surface 10a of the stator core 10 toward the other end surface 10b), and bridge part 21R bridging between the first extension part 21P and the second extension part 21Q in the one end surface 10a side of the stator core 10. In each coil segment, P is added to the end of the reference number if the structure related to the first extension part is represented, Q is added to the end of the reference number if the structure related to the second extension part is represented, and R is added to the end of the reference number if the structure related to the bridge part is represented.

The first extension part 21P of the first coil segment 21 includes a first linear part 21Pa, first bending part 21Pb, and first bonding surface 21Pc.

The first linear part 21Pa is inserteded in parallel to the center axis line C1 with respect to the slot 12 to pass through from the one end surface 10a side to the other end surface 10b side of the stator core 10.

The first bending part 21Pb extends, in the other end surface 10b side of the stator core 10, from the end of the first linear part 21Pa. When being viewed from the one end surface 10a side toward the other end surface 10b of the stator core 10, the first bending part 21Pb bends counter clockwise CCW in the circumferential direction of the stator core 10. The first bending part 21Pb is shown to be bent at approximately 80° counter clockwise CCW with respect to the first linear part 21Pa parallel to the axial direction Z of the stator core, that is, the center axis line C1; however, it may be bent at approximately 30 to 85° with respect to the first linear part 21Pa. The first bending part 21Pb is slightly curved in the circumferential direction of the stator core 10 to be along the area 1T of slots 12 adjacent to each other in the circumferential direction of the stator core 10.

The first bonding surface 21Pc is positioned in the tip of the first bending part 21Pb, and is mechanically and electrically welded with coil segments adjacent to each other in the radial direction of the stator core 10 by welding, in which the welding dot 28 is formed. The first bonding surface 21Pc is positioned approximately parallel to the other end surface 10b of the stator core 10.

The second extension part 21Q of the first coil segment 21 is shaped similarly to the first extension part 21P. The second extension part 21Q includes a second linear part 21Qa, second bending part 21Qb, and second bonding surface 21Qc structured the same as those of the first extension part 21P.

The bridge part 21R of the first coil segment 21 connects the first linear part 21Pa and the second linear part 21Qa in the one end surface 10a of the stator core 10. The bridge part 21R integrally includes a first bending end 21Ra, first extension part 21Rb, connection part 21Rc, second extension part 21Rd, and second bending end 21Re in this order. The first bending end 21Ra is continuous to the first linear part 21Pa to be bent clockwise CW of the circumferential direction of the stator core 10. The first bending end 21Ra corresponds to the bending part bent in the circumferential direction in the part led from the slot 12. The first extension part 21Rb extends from the first bending end 21Ra to clockwise of the circumferential direction of the stator core 10 and the outer side of the radial direction. The second bending end 21Re is continuous to the second linear part 21Qa to be bent counter clockwise of the circumferential direction of the stator core 10. The second bending end 21Re corresponds to the bending part bent in the circumferential direction in the part led from the slot 12. The second extension part 21Rd extends from the second bending end 21Re to the counter clockwise of the circumferential direction of the stator core 10 and the outer side of the radial direction. The connection part 21Rc is formed to curve in an S-letter shape to connect the first extension part 21Rb and the second extension part 2/Rd. In the part of the first extension part 21Rb, a first twisted part 21Rf twisted abount the axial direction of the first coil segment 21 is formed. The first twisted part 21Rf corresponds to the twisted part twisted abount the circumferential direction of the stator core 10. With the first coil segmnet 21, the first bending end 21Ra and the first twisted part 21Rf are provided in order to differentiate the orientation of the first extension part 21P and the bridge part 21R with respect to the stator core 10. Similarly, in the part of the second extension part 21Rd, a second twisted part 21Rg twisted about the acis direction of the first coil segment 21 is formed. The second part 21Rg corresponds to the twisted part twisted about the circumferential direction of the stator core 10. With the first coil segment 21, the second bending end 21Rc and the second twisted part 21Rg are provided in order to differentiate the orientation of the second extension part 21Q and the bridge part 21R with respect to the stator core 10.

The long side surface 21M and the like in the connection part 21Rc of the bridge part 21R are arranged to face the one end surface 10a of the stator core 10. The connection part 21Rc of the bridge part 21R includes a part approximately parallel to the one end surface 10a of the stator core 10. The long side surface 21M in the first linear part 21Pa and the second linear part 21Qa are arranged to be opposed to each other in the radial direction of the stator core 10.

In the first coil segment 21, the bridge part 21R, upper end of the first linear part 21Pa of the first extension part 21P, and upper end of the second linear part 21Qa of the second extension part 21Q form a first coil end 20a in the one end surface 10a of the stator core 10. In the first coil segment 21, the lower end of the first linear part 21Pa of the first extension part 21P, first bending part 21Pb, first bonding surface 21Pc, and lower end of the second linear part 21Qa of the second extension part 21Q, second bending part 21Qb, and second bonding surface 21Qc form a second coil end 20b in the other end surface 10b of the stator core 10. This structure is similarly applied to the second coil segment 22 to the seventh coil segment 27.

The structure of the second coil segment 22 positioned in the area 1T (lane 1) of the slot 12 will be explained.

The second coil segmnet 22 is shaped similarly to the above-described first coil segment 21.

The second coil segment 22 is inserted in the area 1T of two different slots 12. The second coil segment 22 is formed larger than the first coil segment 21. The first linear part 22Pa and the second linear part 22Qa of the second coil segment 22 are arranged to hold the first linear part 21Pa and the second linear part 21Qa of the first coil segment 21 from both sides of the circumferential direction of the stator core 10.

The second coil segment 22 integrally includes a first extension part arranged in the slot 12, and second extension part arranged in the slot 12 which is seven units apart from the slot 12 where the first extension part 22P is inserted in the circumferential direction of the stator core 10 (clockwise), and bridge part 22R bridging between the first extension part and the second extension part in the one end surface 10a side of the stator core 10.

The first extension part includes a first linear part 22Pa, first bending part 22Pb, and first bonding surface. The first extension part is structured the same as the first extension part 21P of the first coil segment 21.

The second extension part includes a second linear part 22Qa, second bending part 22Qb, and second bonding surface 22Qc structured similarly to the first extension part. The second extension part is shaped similarly to the first extension part.

The bridge part 22R integrally includes a first bending end, first extension part, connection part, second extension part, second bending part, first twisted part, and second twisted part. The bridge part 22R is structured the same as the bridge part 21R of the first coil segment 21.

Figure 6:
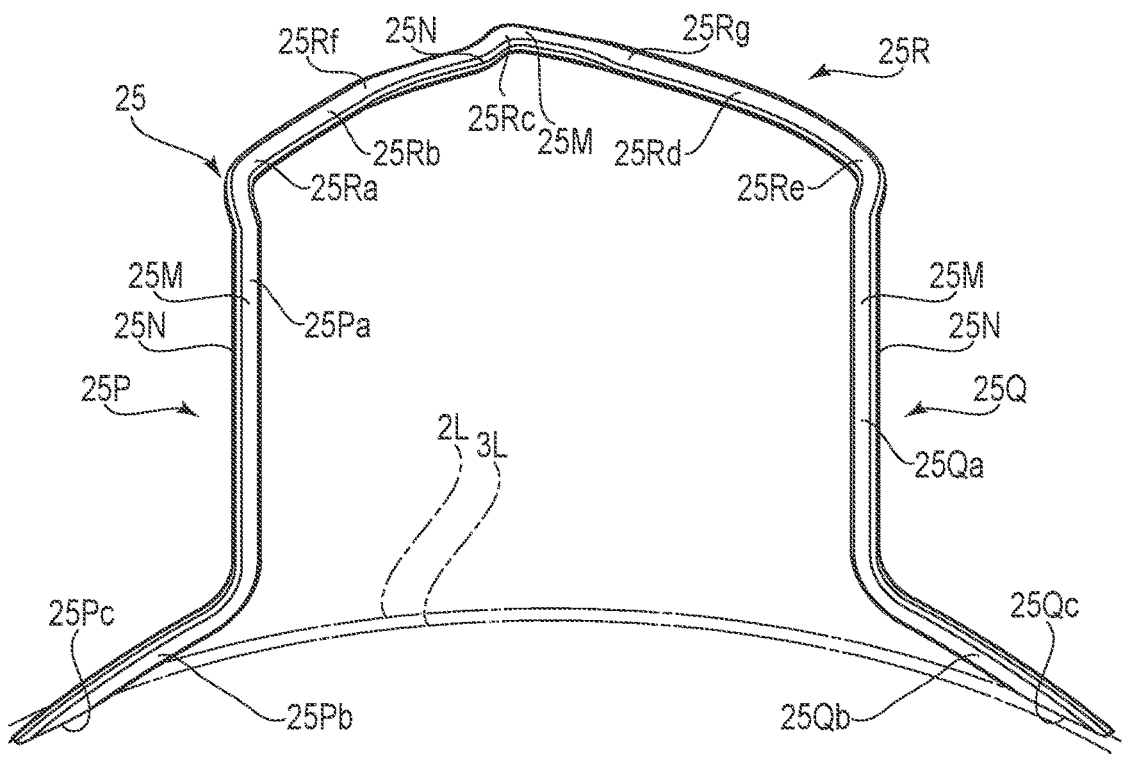
FIG. 6 is a perspective view of a fifth coil segment positioned over lanes 2 and 3 of the slot.

With reference to FIG. 6, the structure of the fifth coil segment 25 positioned in areas 2T and 3T (lanes 2 and 3) of the slots 12 will be explained.

FIG. 6 is a perspective view of the fifth coil segment 25 positioned over lanes 2 and 3 of the slots 12.

As in FIG. 6, the fifth coil segment 25 is inserted through the areas 2T and 3T of different slots 12. A first linear part 25Pa of the fifth coil segment 25 is inserted in the area 3T which is one of the two areas 3T and 2T (for example, structuring lanes 3 and 2) which are relatively shifted by one from each other in the radial direction of the stator core 10, and the second linear part 25Qa of the fifth coil segment 25 is inserted in the other area 2T.

The fifth coil segment 25 integrally includes a first extension part 25P arranged in the slot 12, and second extension part 25Q arranged in the slot 12 which is six units apart from the slot 12 where the first extension part 25P is arranged in the circumferential direction of the stator core 10 (counter clockwise), and bridge part 25R bridging between the first extension part 25P and the second extension part 25Q in the one end surface 10a side of the stator core 10.

The first extension part 25P includes a first linear part 25Pa, first bending part 25Pb, and first bonding surface 25Pc. The first extension part 25P is structured the same as the first extension part 21P of the first coil segment 21.

The second extension part 25Q includes a second linear part 25Qa, second bending part 25Qb, and second bonding surface 25Qc. Note that, as being viewed from the one end surface 10a side to the other end surface 10b side of the stator core 10, the second bending part 25Qb is bent clockwise in the circumferential direction of the stator core 10.

The bridge part 25R integrally includes a first bending end 25Ra, first extension part 25Rb, connection part 25Rc, second extension part 25Rd, and second bending end 25Re. The bridge part 25R of the fifth coil segment 25 is structured the same as the bridge part 21R of the first coil segment 21. The first bending end 25Ra and the second bending end 25Re correspond to the bending parts bent in the circumferential direction in the part led from the slots 12.

The structure of the sixth coil segment 26 positioned in areas 4T and 5T (lanes 4 and 5) of the slots 12 will be explained.

The sixth coil segment 26 is shaped similarly to the above-described fifth coil segment 25.

The sixth coil segment 26 is inserted through the areas 4T and 5T of different slots 12. A first linear part of the sixth coil segment 26 is inserted in the area 5T which is one of the two areas 5T and 4T (for example, structuring lanes 5 and 4) which are relatively shifted by one from each other in the radial direction of the stator core 10, and the second linear part of the sixth coil segment 26 is inserted in the other area 4T. The sixth coil segment 26 is shaped similarly to the fifth coil segment 25.

The first extension part includes a first linear part, first bending part 26Pb, and first bonding surface. The first extension part is structured the same as the first extension part 25P of the sifth coil segment 25.

The second extension part includes a second linear part, second bending part 26Qb, and second bonding surface. The second extension part is structured the same as the second extension part 25Q of the fifth coil segment 25.

The bridge part integrally includes a first bending end, first extension part, connection part, second extension part, second bending end, first twisted part, and second twisted part. The bridge part is structured the same as the bridge part 25R of the fifth coil segment 25.

The structure of the seventh coil segment 27 positioned in areas 6T and 7T (lanes 6 and 7) of the slots 12 will be explained.

The seventh coil segment 27 is shaped similarly to the above-described fifth coil segment 25 and the sixth coil segment 26.

The seventh coil segment 27 is inserted through the areas 6T and 7T of different slots 12. A first linear part Pa of the seventh coil segment 27 is inserted in the area 7T which is one of the two areas 7T and 6T (for example, structuring lanes 7 and 6) which are relatively shifted by one from each other in the radial direction of the stator core 10, and the second linear part 27Pa of the seventh coil segment 27 is inserted in the other area 6T. The seventh coil segment 27 is shaped similarly to the fifth coil segment 25.

The first extension part includes a first linear part 27Pa, first bending part 27Pb, first bonding surface, and third twisted part. The first extension part is structured the same as the first extension part 25P of the sifth coil segment 25 except for the short side surface 27N facing the radial direction of the stator core 10 and having the third twisted part.

The second extension part includes a second linear part 27Qa, second bending part 27Qb, and second bonding surface. The second extension part is structured the same as the second extension part 25Q of the fifth coil segment 25.

The bridge part integrally includes a first bending end, first extension part, connection part, second extension part, second bending end, and second twisted part. The bridge part is structured the same as the bridge part 25R of the fifth coil segment 25.

Figure 7:
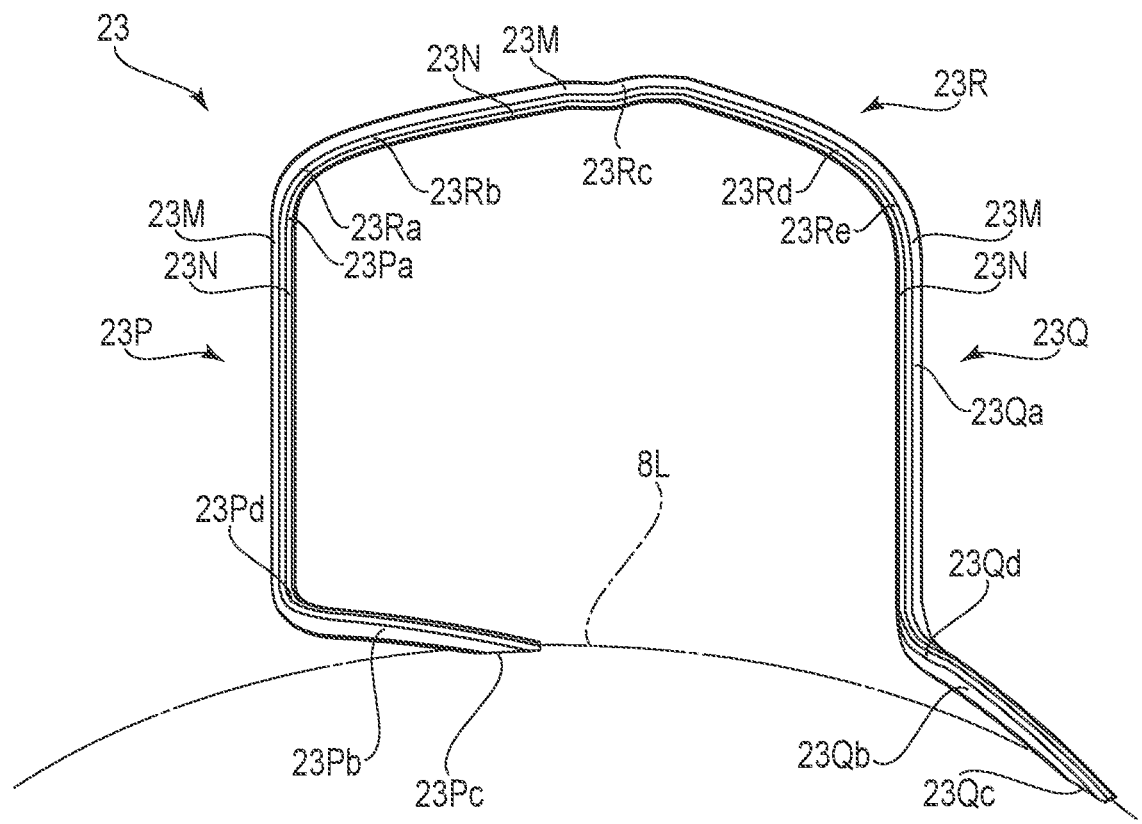
FIG. 7 is a perspective view of a third coil segment positioned in lane 8 (innermost peripheral lane) of the slot.

With reference to FIG. 7, the structure of the third coil segment 23 positioned in the area 8T (lane 8) which is the innermost area in the slot 12 will be explained.

FIG. 7 is a perspective view illustrating the third coil segment 23 positioned in the lane 8 (innermost peripheral lane) of slot 12.

As in FIG. 7, the third coil segment 23 is arranged in the area 8T of different slots 12. The third coil segment 23 integrally includes a first extension part 23P inserted in the slot 12, and second extension part 23Q inserted in the slot 12 which is seven units apart from the slot 12 where the first extension part 23P is inserted in the circumferential direction of the stator core 10 (clockwise direction), and bridge part 23R bridging between the first extension part 23P and the second extension part 23Q in the one end surface 10a side of the stator core 10.

The first extension part 23P includes a first linear part 23Pa, first bending part 23Pb, first bonding surface 23Pc, and third twisted part 23Pd. The third twisted part 23Pd is twisted about the axial direction of the third coil segment 23 between the first linear part 23Pa and the first bending part 23Pb. The first extension part 23P is structured the same as the first extension part 21P of the first coil segment 21 except for the third twisted part 23Pd. Note that, the first bending part 23Pb is bent clockwise in the circumferential direction of the stator core 10 as being viewed from the one end surface 10a to the other end surface 10b of the stator core 10.

The second extension part 23Q is shaped similarly to the first extension part 23P. The second extension part 23Q includes a second linear part 23Qa, second bending part 23Qb, second bonding surface 23Qc, and fourth twisted part 23Qd structured similarly to the first extension part 23P. The fourth twisted part 23Qd is twisted about the axial direction of the third coil segment 23 between the second linear part 23Qa and the second bending part 23Qb.

The bridge part 23R integrally includes a first bending end 23Ra, first extension part 23Rb, connection part 23Rc, second extension part 23Rd, and second bending end 23Re. The bridge part 23R is structured the same as the bridge part 21R of the first coil segment 21 except for lacking of a first twisted part and second twisted part. The first bending end 23Ra and the second bending end 23Re correspond to the bending parts bent in the circumferential direction in the part led from the slots 12.

The structure of the fourth coil segment 24 positioned in the area 8T (lane 8) in the slot 12 will be explained.

The fourth coil segment 24 is shaped similarly to the above-described third coil segment 23.

The fourth coil segment 24 is arranged in the area 8T of different slots 12. The fourth coil segment 24 is shaped similarly to the third coil segment 23, and is formed smaller than the third coil segment 23. A first linear part 24Pa and a second linear part 24Qa of the fourth coil segment 24 are arranged to be held by the first linear part 23Pa and the second linear part 23Qa of the third coil segment 23 from both sides of the circumferential direction of the stator core 10.

The fourth coil segment 24 integrally includes a first extension part inserted in the slot 12, second extension part inserted in the slot 12 which is five units apart from the slot 12 where the first extension part is inserted in the circumferential direction of the stator core 10 (clockwise direction), and bridge part 24R bridging between the first extension part and the second extension part in the one end surface 10a side of the stator core 10.

The first extension part includes a first linear part 24Pa, first bending part 24Pb, first bonding surface, and third twisted part. The first extension part is structured the same as the first extension part 23P of the third coil segment 23.

The second extension part includes a second linear part 24Qa, second bending part 24Qb, second bonding surface, and fourth twisted part, structured the same as the first extension part. The second extension part is shaped similarly to the first extension part.

The bridge part 24R integrally includes a first bending end, first extension part, connection part, second extension part, and second bending end. The bridge part 24R is structured the same as the bridge part 23R of the third coil segment.

Figure 8:
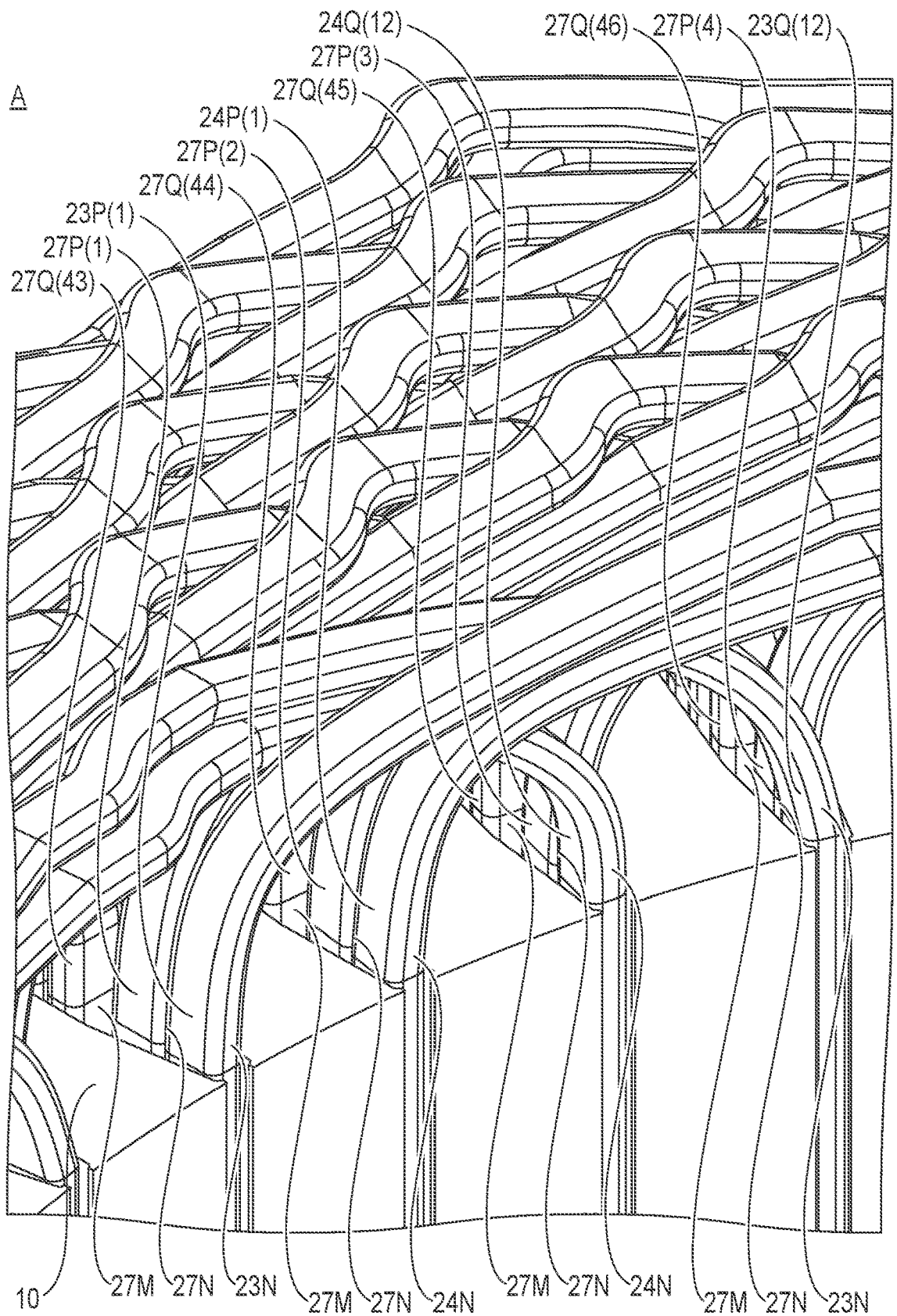
FIG. 8 is a perspective view of main parts of the stator of the first embodiment.
Figure 9:
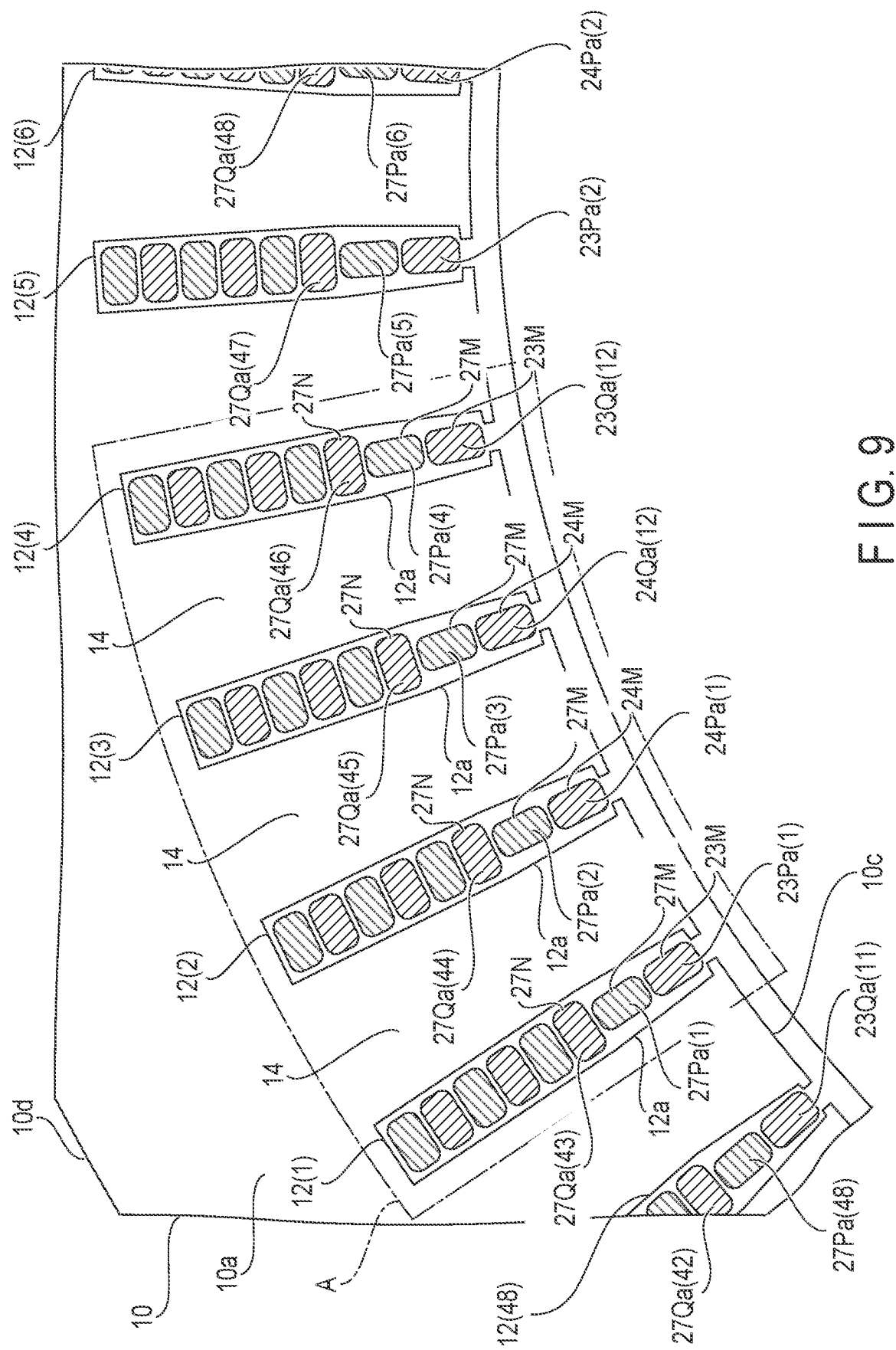
FIG. 9 is a horizontal cross-sectional view of the main parts of FIG. 8.

With reference to FIGS. 8 and 9, the arrangement (orientation of each of the long side surface and the short side surface) of the third coil segment 23, fourth coil segment 24, and seventh coil segment 27 in the slots 12 will be explained.

FIG. 8 is a perspective view of main parts of the stator of the first embodiment, and FIG. 9 is a horizontal cross-sectional view of the main parts.

In the first embodiment of FIGS. 8 and 9, the third coil segment 23 and the fourth coil segment 24 are included in the first rectangular conductor, for example. The first rectangular conductor includes, in the part led from the slot 12, a bending part extending from the linear part and bent in the circumferential direction of the stator core 10. In the first embodiment, the first rectangular conductor does not include a twisted part twisted about the circumferential direction of the stator core 10 in the part led from the slot 12.

Furthermore, the seventh coil segment 27 is included in, for example, the second rectangular conductor. The second rectangular conductor includes, in the part led from the slot 12, a bending part extending from the linear part and bent in the circumferential direction of the stator core 10 and a twisted part extending from the bending part and twisted about the circumferential direction of the stator core 10.

The first coil segment (third coil segment 23) includes two bending parts in the part where short sides of the first linear part and the second linear part face the radial direction of the stator core 10 and between different slots 12 which are inserted. The second coil segment (fourth coil segment 24) includes two bending parts in the part where short sides of the first linear part and the second linear part face the radial direction of the stator core 12 and between different slots 12 which are inserted.

FIG. 8 illustrates the first extension part and the second extension part including the first linear parts and the second linear parts of the third coil segment 23, fourth coil segment 24, and seventh coil segment 27.

FIG. 9 illustrates, of 48 slots 12 arranged in the circumferential direction of the stator core 10 at regular intervals (7.5°), first slot 12 (1), second slot 12 (2), third slot 12 (3), fourth slot 12 (4), fifth slot 12 (5), sixth slot 12 (6), and 48th slot (48) defined from an optional position. For example, (1) of first slot 12 (1) corresponds to the first. Similarly, FIG. 9 illustrate, of 12 third coil segments 23 arranged in the circumferential direction of the stator core 10 at regular intervals (30°), first first linear part 23Pa (1) and second first linear part 23Pa (2) defined with reference to the position of the first slot 12 (1). Similarly, first second linear part 23Qa (11) and twelfth second linear part 23Qa (12) are shown. Similarly, FIG. 9 illustrates, of 12 fourth coil segments 24 arranged in the circumferential direction of the stator core 10 at regular intervals) (30°), first first linear part 24Pa (1) and second first linear part 24Pa (2) defined with reference to the position of the first slot 12 (1). Similarly, twelfth second linear part 24Qa (12) is shown. Similarly, FIG. 9 illustrates, of 48 seventh coil segments 27 arranged in the circumferential direction of the stator core 10 at regular intervals (7.5°), first first linear part 27Pa (1), second first linear part 27Pa (2), third first linear part 27Pa (3), fourth first linear part 27Pa (4), fifth first linear part 27Pa (5), sixth first linear part 27Pa (6), and 48th first linear part 27Pa (48). Similarly, FIG. 9 illustrates 42nd second linear part 27Qa (42), 43rd second linear part 27Pa (43), 44th second linear part 27Qa (44), 45th second linear part 27Qa (45), 46th second linear part 27Qa (46), 47th second linear part 27Qa (47), and 48th second linear part 27Qa (48).

As in FIG. 9, a taper 12a is formed in the slot 12 in the inner peripheral surface 10c side of the stator core 10. Thus, the width in the circumferential direction of the stator core 10 of the slot 12 is formed to be narrowest in the innermost part of the radial direction of the stator core 10.

As in FIGS. 8 and 9, regarding the first linear part 23Pa and the second linear part 23Qa of the third coil segment 23, the long side surface 23M faces the circumferential direction of the stator core 10 while the short side surface 23N faces the radial direction of the stator core 10.

As with the third coil segment 23, regarding the first linear part 24Pa and the second linear part 24Qa of the fourth coil segment 24, the long side surface 24M faces the circumferential direction of the stator core 10 while the short side surface 24N faces the radial direction of the stator core 10.

As with the third coil segment 23 and the fourth coil segment 24, regarding the first linear part 27Pa of the seventh coil segment 27, the long side surface 27M faces the circumferential direction of the stator core 10 while the short side surface 27N faces the radial direction of the stator core 10. On the other hand, regarding the second linear part 27Qa of the seventh coil segment 27, unlike the first linear part 27Pa, the long side surface 27M faces the radial direction of the stator core 10 while the short side surface 27N faces the circumferential direction of the stator core 10.

Thus, in the lane 8 which is a virtual same circle (outermost peripheral lane) connecting the areas 8T of 48 slots 12, the long side surfaces of all of the third coil segments 23 and the fourth coil segments 24 face the stator core 10 while the short side surfaces 27N thereof face the radial direction. Similarly, in the lane 7 which connects the areas 7T of 48 slots 12, the long side surfaces 27M of the first linear parts 27Pa of all of the seventh coil segments 27 face the circumferential direction of the stator core 10 while the short side surfaces 27N thereof face the radial direction. On the other hand, in the lane 6 which connects the areas 6T of 48 slots 12, the long side surfaces 27M of the second linear parts 27Qa of the seventh coil segments 27 face the radial direction of the stator core 10 while the short side surfaces 27N thereof face the circumferential direction.

With the first embodiment (stator 110 of rotary electric machine 100, and rotary electric machine 100) structured as above, the fourth coil segment 24 (corresponding to first coil segment) includes the short sides of the first linear part and the second linear part facing the radial direction and includes two bending parts in the part between different slots which are inserted. The third coil segment 23 (corresponding to second coil segment) includes the short sides of the first linear part and the second linear part facing the radial direction and includes two bending parts in the part between different slots which are inserted. In the innermost area of the radial direction of the slot 12 (area 8T), the fourth coil segment 24 (first coil segment) including the long side surfaces 24M of the first linear part 24Pa and the second linear part 24Qa facing the circumferential direction of the stator core 10, and the third coil segment 23 (second coil segment) including the long side surfaces 23M of the first linear part 23Pa and the second linear part 23Qa facing the circumferential direction are arranged. The width of the slots 12 in the circumferential direction is, because of the taper 12a, shortest in the innermost part in the radial direction of the stator core 10.

With the above structure, the third coil segment 23 which is arranged in the innermost area in the radial direction of the stator core 10 in the slot 12 (area 8T) can be formed by simply being bent in the axial direction of the stator core 10 through the first linear part 23Pa to the second linear part 23Qa via the bridge part 23R without changing the orientation of the long side surface 23M and the short side surface 23N, and thus, can be manufactured easily. Note that, for example, the bridge part 23R of the third coil segment 23 must be connected to the first linear part 23Pa and the second linear part 23Qa in a relatively shorter distance along the circumferential direction of the stator core 10 as compared to, for example, the bridge part 27R of the seventh coil segment 27 positioned in a relatively outer side of the radial direction of the stator core 10, and thus, is difficult to be treated.

Furthermore, the innermost part in the radial direction of the stator core 10 of the slot 12 is positioned such that the long side surface 23M of the third coil segment 23 faces the circumferential direction of the stator core 10, and thus, as compared to a case where the short side surface 23N faces the circumferential direction, the width of the slot 12 in the circumferential direction can be relatively shortened. That is, by relatively increasing the width of the teeth 14 in the circumferential direction between adjacent slots 12, the volume of the teeth 14 can be increased. Thus, the density of magnetic flux in the tip end (the inner peripheral surface 10c side of the stator core 10) of the teeth 14 can be increased, and the magnetic saturation can be suppressed.

Furthermore, for example, the third coil segment 23 includes the long side surface 23M in the bridge part 23R with a part approximately parallel to the one end surface 10a of the stator core 10, and thus, as compared to a case where there is no part approximately parallel to the one end surface 10a of the long side surface 23M, a length projecting from the one end surface 10a in the axial direction can be shortened.

On the other hand, for example, the seventh coil segment 27 arranged in the areas other than the innermost area in the radial direction of the slot 12 includes the long side surface 27M in the bridge part 27R with a part approximately parallel to the one end surface 10a of the stator core 10, and thus, as compared to a case where there is no part approximately parallel to the one end surface 10a of the long side surface 27M, a length projecting from the one end surface 10a in the axial direction can be shortened. Furthermore, the seventh coil segment 27 includes the bridge part 27R with a first twisted part 27Rf and a second twisted part 27Rg twisted about the axial direction of the seventh coil segment 27, and thus, as compared to a case where there is not the first twisted part 27Rf or the second twisted part 27Rg, the orientation of the long side surface 27M and the short side surface 27N is easily changeable about the axial direction, and a length projecting from the one end surface 10a in the axial direction can be shortened.

Thus, the stator 110 can be miniaturized with respect to the axial direction while maintaining the electric performance. Furthermore, the manufacturing performance of the stator core 110 can be increased.

Especially, in the innermost area in the radial direction of the stator core 10 of the slot 12 (area 8T), the width of all the slots 12 in the circumferential direction of the stator core 10 is relatively shortened while the width of all the teeth 14 in the circumferential direction is relatively elongated to increase the volume of the teeth 14. Thus, the density of magnetic flux in the teeth 14 is sufficiently improved, and the magnetic saturation can be sufficiently suppressed.

Second Embodiment

Figure 10:
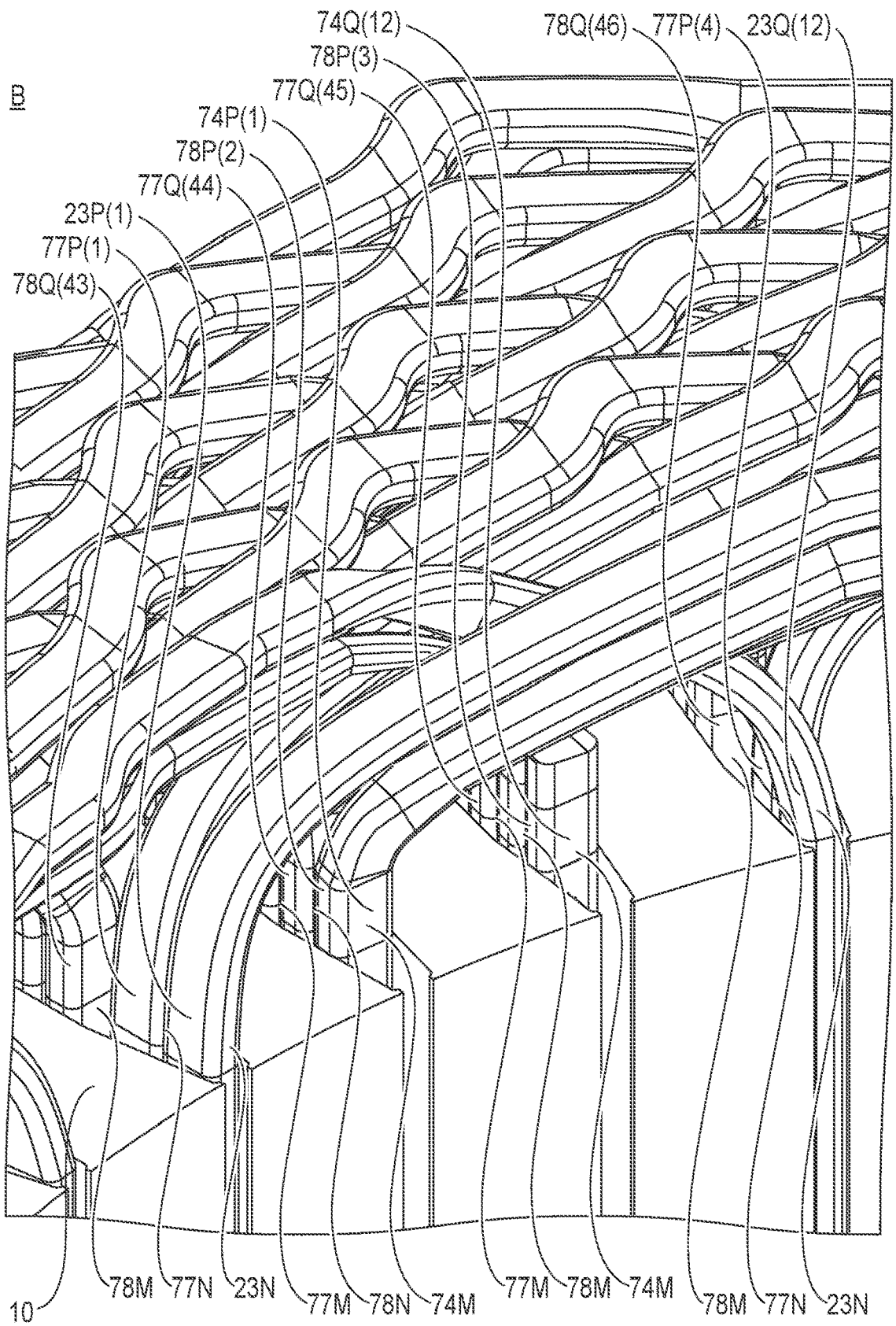
FIG. 10 is a perspective view of main parts of the stator of a second embodiment.
Figure 11:
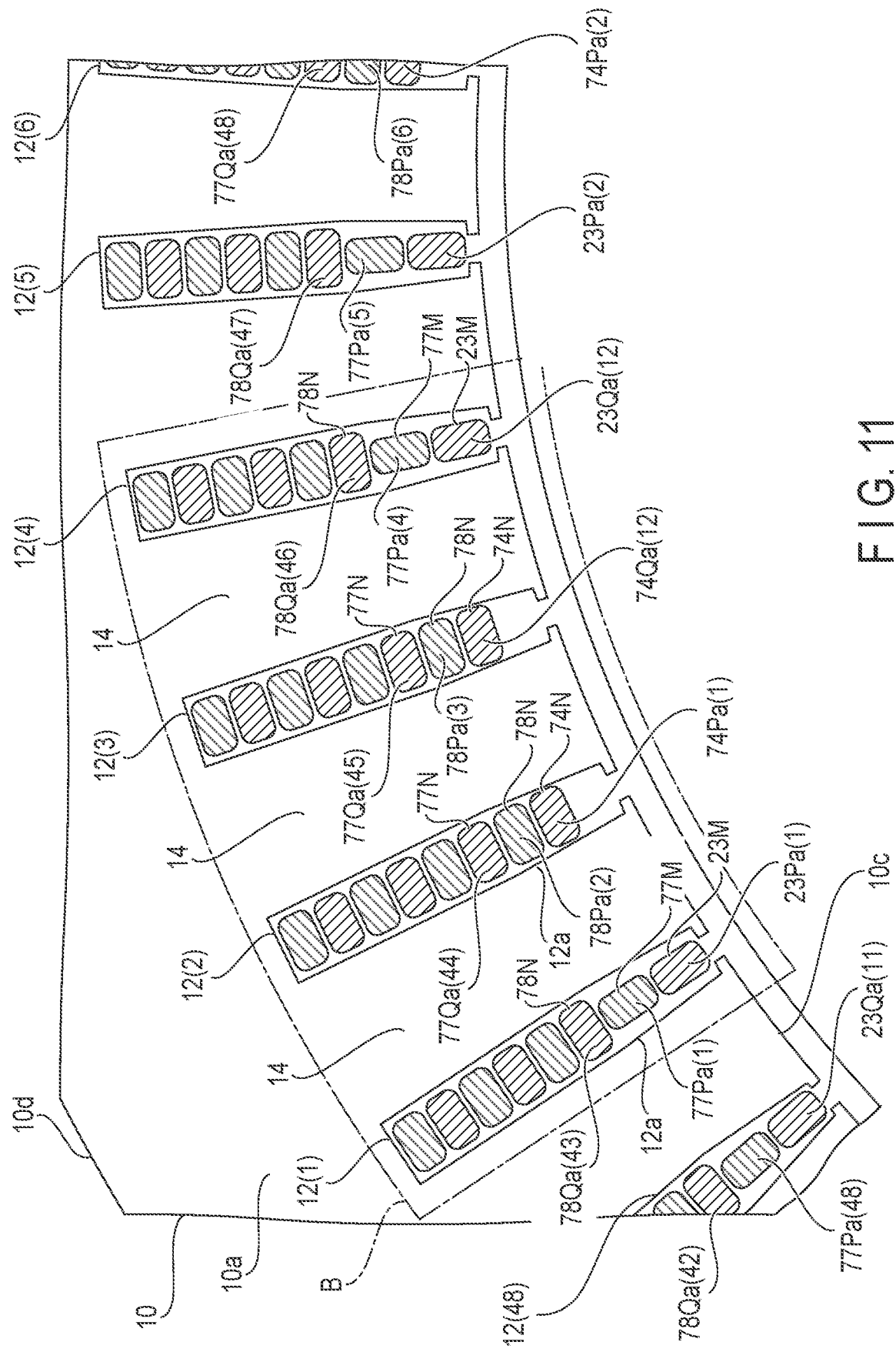
FIG. 11 is a horizontal cross-sectional view of the main parts of FIG. 10.

With reference to FIGS. 10 and 11, the arrangement (orientation of each of the long side surface and the short side surface) of the third coil segment 23, fourth coil segment 74, seventh coil segment 77, eighth coil segment 78 in the slots 12 will be explained.

FIG. 10 is a perspective view of main parts of a stator of a second embodiment, and FIG. 11 is a horizontal cross-sectional view of the main parts.

In the second embodiment of FIGS. 10 and 11, the third coil segment 23 is included in, for example, the first rectangular conductor. The first rectangular conductor includes, in the part led from the slot 12, a bending part extending from the linear part and bent in the circumferential direction of the stator core 10. The first rectangular conductor does not include a twisted part twisted about the circumferential direction of the stator core 10 in the part led from the slot 12.

Furthermore, the fourth coil segment 74, seventh coil segment 77, and eighth coil segment 78 are included in, for example, the second rectangular conductor. The second rectangular conductor includes, in the part led from the slot 12, a bending part extending from the linear part and bent in the circumferential direction of the stator core 10 and a twisted part extending from the bending part and twisted about the circumferential direction of the stator core 10.

In the second embodiment, the fourth coil segment 74 (corresponding to the first coil segment) includes the first linear part and the second linear part long sides of which face the radial direction, and has, in the part between different slots 12 which are inserted, two bending parts and two twisted parts. The third coil segment 23 (corresponding to the second coil segment) includes the first linear part and the second linear part short sides of which face the radial direction and has, in the part between different slots 12 which are inserted, two bending parts.

As in FIGS. 10 and 11, the first linear part 23Pa and the second linear part 23Qa of the third coil segment 23 include the long side surface 23M facing the circumferential direction of the stator core 10 while the short side surface 23N faces the radial direction of the stator core 10.

The first linear part 74Pa and the second linear part 74Qa of the fourth coil segment 74 include the long side surface 74M facing the radial direction of the stator core 10 while the short side surface 74N faces the circumferential direction of the stator core 10.

In the seventh coil segment 77, the long side surface 77M of the first linear part 77Pa and the and the short side surface 77N of the second linear part 77Qa face the circumferential direction of the stator core 10. In the eighth coil segment 78, the short side surfaces 78N of the first linear part 78Pa and the second linear part 78Qa face the circumferential direction of the stator core 10. Two of the seventh coil segments 77 and two of the eighth coil segments are arranged alternately in the stator core 10 replacing the seventh coil segment 27 of the first embodiment. That is, in the circumferential direction of the stator core 10, two adjacent seventh coil segments 77 and adjacent two eighth coil segment 78 are arranged alternately.

Thus, especially in the lane 8 connecting the areas 8T of 48 slots 12 (outermost peripheral lane), two third coil segments 23 in which the long side surface 23M faces the circumferential direction of the stator core 10 while the short side surface 23N faces the radial direction, and two fourth coil segments 74 in which the long side surface 74M faces the radial direction of the stator core 10 while the short side surface 74N faces the circumferential direction are arranged alternately. The arrangement of the long side surface and the short side surface of the coil segment in the lane 7 connecting the areas 7T of 48 slots 12 is the same as that of the above-described lane 8.

With the second embodiment (stator 110 of rotary electric machine 100, and rotary electric machine 100) structured as above, in the innermost area in the radial direction of the stator core 10 of the slot 12, the fourth coil segment 24 (corresponding to first coil segment) includes the long side surface 74M of the first linear part 74Pa and the second linear part 74Qa facing the radial direction of the stator core 10 and including a twisted part and the third coil segment 23 (second coil segment) includes the short side surface 23N of the first linear part 23Pa and the second linear part 23Qa facing the radial direction of the stator core 10.

With the above structure, the bridge part 74R of the fourth coil segment 74 can easily avoid interference with by the seventh coil segment 77 and the eighth coil segment 78 adjacent to each other in the radial direction of the stator core 10 as compared to the bridge part 23R of the third coil segment 23, and thus, bending treatment, twisting treatment, and the like are easily performable. Thus, the fourth coil segment 74 is arranged such that the long side surfaces of the second linear part 74Qa and the second linear part 74Qa are opposed to each other in the radial direction of the stator core 10. Furthermore, the fourth coil segment 74 includes the twisted part of the bridge part 73R such that the orientation of the long side surface 74M and the short side surface 74N is easily changed about the axial direction of the fourth coil segment 74. That is, the orientation of the long side surface 74M and the short side surface 74N is differed from that of the first embodiment with respect to the fourth coil segment 74 which is relatively easy to avoid the interference and is easily treated.

On the other hand, as compared to the fourth coil segment 74, the third coil segment 23 is easily interfered with the seventh coil segment 77 and the eighth coil segment 28 and is difficult to be subjected to the bending treatment, twisting treatment, and the like. Thus, as with the first embodiment, the long side surface 23M faces the circumferential direction of the stator core 10.

Thus, the manufacturing performance of the stator core 110 can be increased because of the easily treatable coil segments.

Third Embodiment

Figure 12:
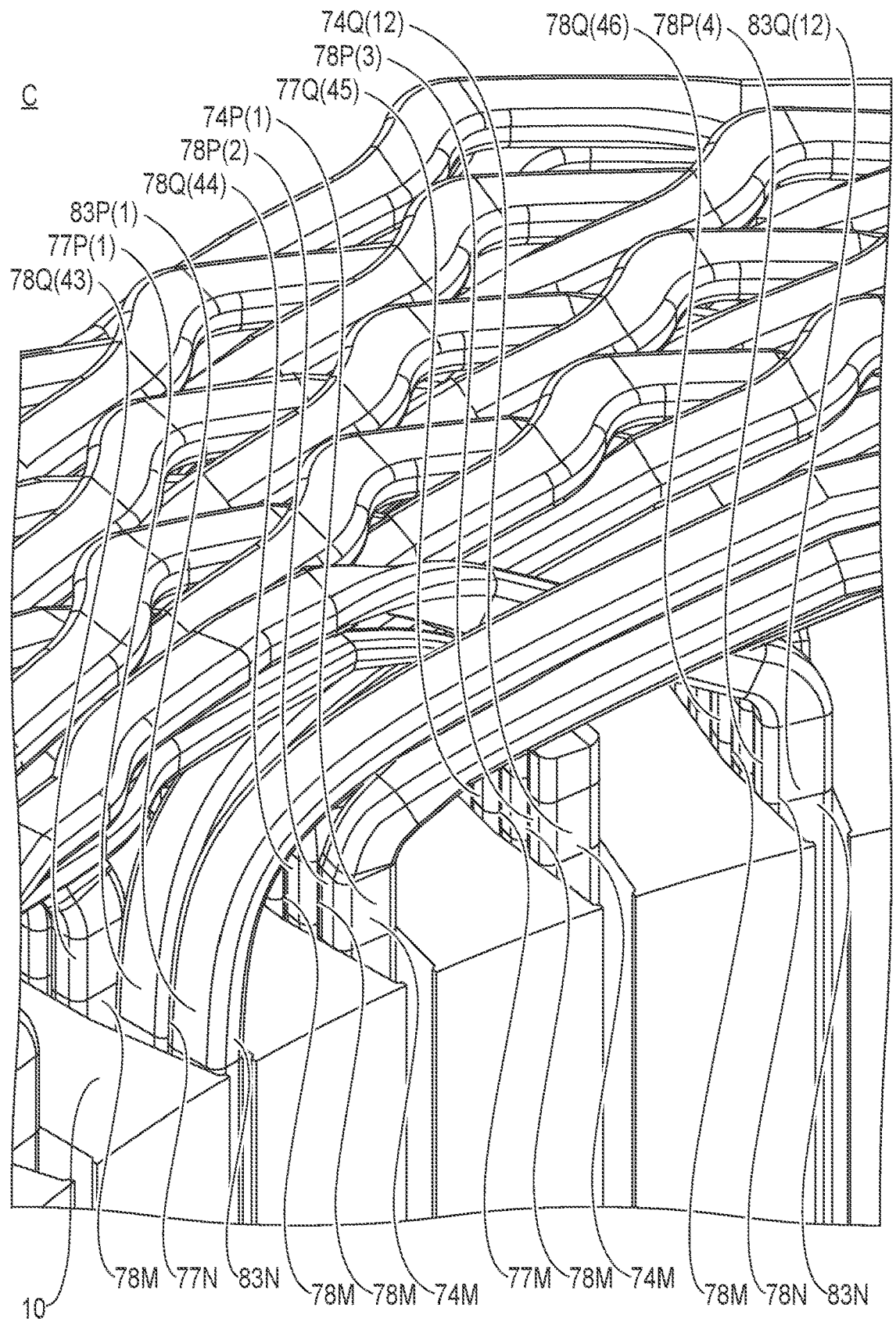
FIG. 12 is a perspective view of main parts of the stator of a third embodiment.
Figure 13:
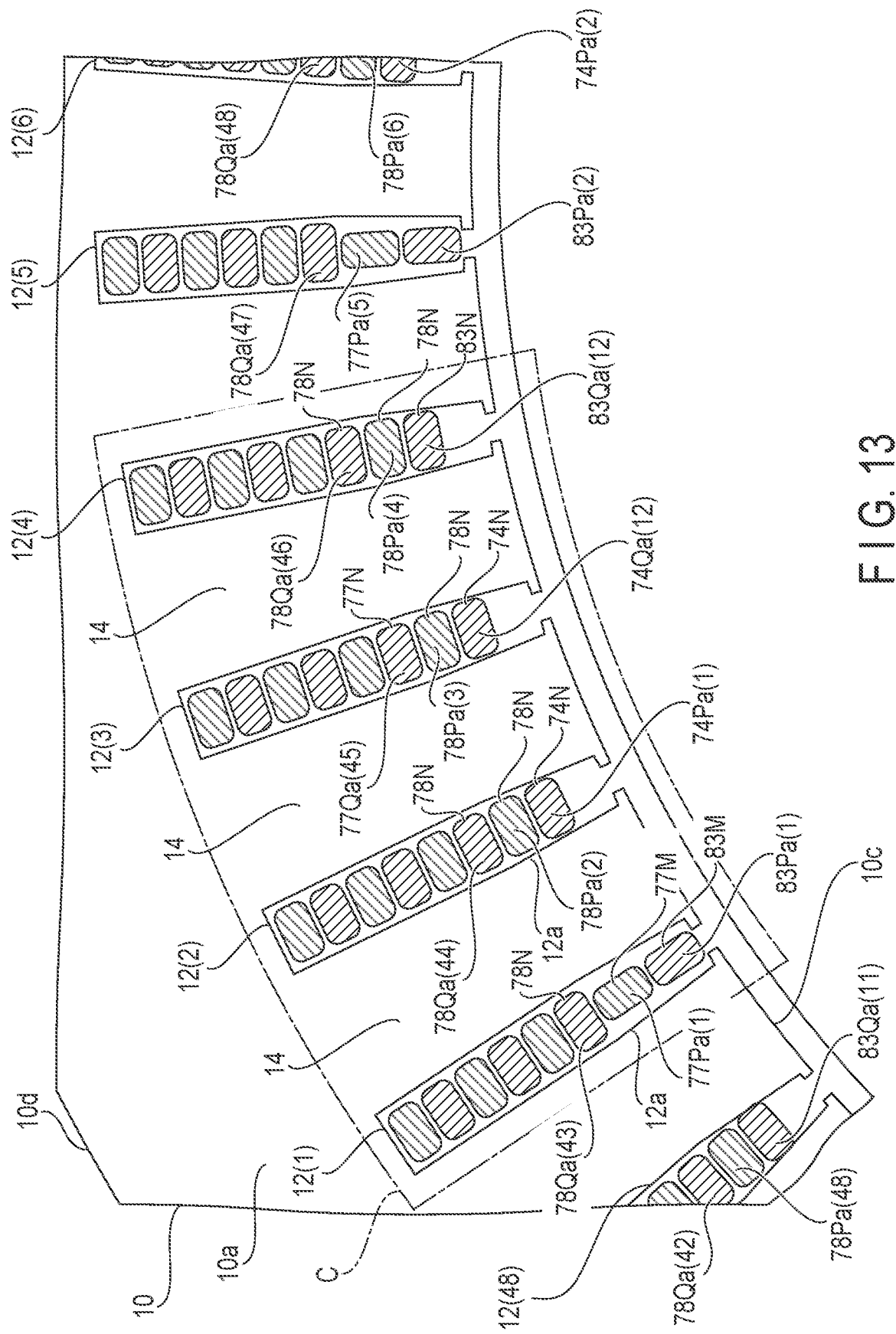
FIG. 13 is a horizontal cross-sectional view of the main parts of FIG. 12.

With reference to FIGS. 12 and 13, the arrangement (orientation of each of the long side surface and the short side surface) of the third coil segment 83, fourth coil segment 74, seventh coil segment 77, eighth coil segment 78 in the slots 12 will be explained.

The third embodiment is a variation of the second embodiment.

FIG. 12 is a perspective view of main parts of a stator of a third embodiment, and FIG. 13 is a horizontal cross-sectional view of the main parts of FIG. 12.

In the third embodiment of FIGS. 12 and 13, the third coil segment 83 is included in, for example, the first rectangular conductor. The first rectangular conductor includes, in the part led from the slot 12, a bending part extending from the linear part and bent in the circumferential direction of the stator core 10.

Furthermore, the fourth coil segment 74, seventh coil segment 77, and eighth coil segment 78 are included in, for example, the second rectangular conductor. The second rectangular conductor includes, in the part led from the slot 12, a bending part extending from the linear part and bent in the circumferential direction of the stator core 10 and a twisted part extending from the bending part and twisted about the circumferential direction of the stator core 10.

In the third embodiment, the fourth coil segment 74 (corresponding to the first coil segment) includes the first linear part and the second linear part long sides of which face the radial direction, and has, in the part between different slots 12 which are inserted, two bending parts and two twisted parts. The third coil segment 23 (corresponding to the second coil segment) includes the first linear part and the second linear part short sides of which face the radial direction and has, in the part between different slots 12 which are inserted, two bending parts and one twisted part.

As in FIGS. 12 and 13, the first linear part 83Pa of the third coil segment 83 includes the long side surface 23M facing the circumferential direction of the stator core 10 while the short side surface 23N faces the radial direction of the stator core 10. On the other hand, the second linear part 83Qa of the third coil segment 83 includes, unlike the third coil segment 23 of the first embodiment, the long side surface 83M facing the radial direction of the stator core 10 while the short side surface 74N faces the circumferential direction of the stator core 10.

The first linear part 74Pa and the second linear part 74Qa of the fourth coil segment 74 include the long side surface 74M facing the radial direction of the stator core 10 while the short side surface 74N faces the circumferential direction of the stator core 10.

The seventh coil segments 77 are arranged, in the circumferential direction of the stator core 10, skipping every four (1, 5, 9, . . . ). The eighth coil segments 78 are arranged, in the circumferential direction of the stator core 10, at positions where there is no seventh coil segment 77 (2, 3, 4, 6, 7, 8, 10, 11, 12, . . . ). That is, in the circumferential direction of the stator core 10, one seventh coil segment 77 and continuous three eight coil segments 78 are arranged alternately.

Thus, especially in the lane 8 connecting the areas 8T of 48 slots 12 (outermost peripheral lane), one third coil segment 83 in which the long side surface 83M faces the circumferential direction of the stator core 10 while the short side surface 83N faces the radial direction, and three fourth coil segments 74 in which the long side surface 74M faces the radial direction of the stator core 10 while the short side surface 74N faces the circumferential direction are arranged alternately. The arrangement of the long side surface and the short side surface of the coil segment in the lane 7 connecting the areas 7T of 48 slots 12 is the same as that of the above-described lane 8.

With the third embodiment (stator 110 of rotary electric machine 100, and rotary electric machine 100) structured as above, in the innermost area in the radial direction of the stator core 10 of the slot 12, the fourth coil segment 74 (corresponding to first coil segment) includes the long side surface 74M of the first linear part 74Pa and the second linear part 74Qa facing the radial direction of the stator core 10 and and the third coil segment 83 (second coil segment) includes the short side surface 83N of the first linear part 83Pa facing the radial direction and the long side surface 83M of the second linear part 83Qa facing the radial direction, and including a twisted part in the bridge part 83R.

With the above structure, in addition to the structure of the second embodiment, of the first linear part 83Pa and the second linear part 83Qa of the third coil segment 83, the second linear part 83Qa side bridge part of which is relatively easy to be treated is arranged such that the long side surface 83M is opposed to the radial direction of the stator core 10. Furthermore, the third coil segment 83 is formed such that the orientation of the long side surface 83M and the short side surface 83N can be easily changed about the axial direction because of the twisted part of the bridge part 83R.

Thus, the manufacturing performance of the stator core 110 can be increased because of the easily treatable coil segments.

Fourth Embodiment

Figure 14:
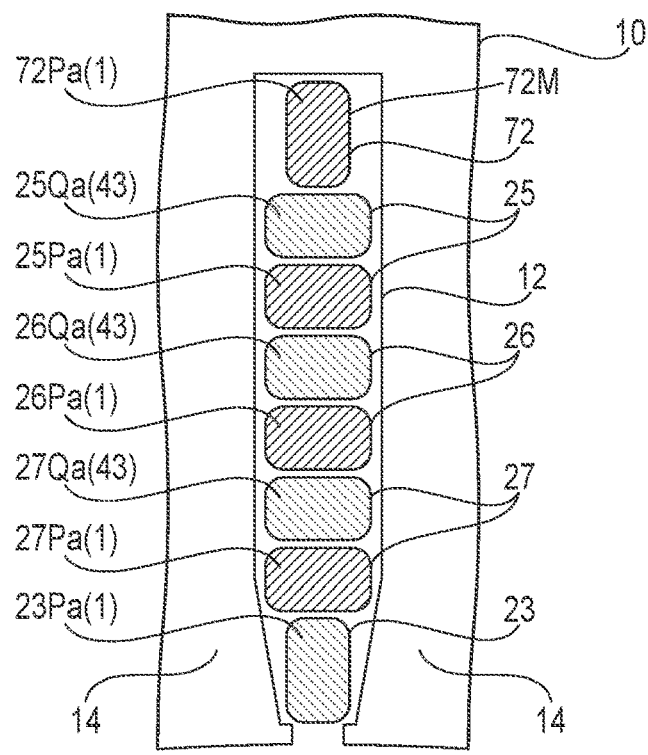
FIG. 14 is a horizontal cross-sectional view of a slot part of a stator of a fourth embodiment.

With reference to FIG. 14, the arrangement of coil segments of slots 12 will be explained.

The fourth embodiment is a variation of the first to third embodiments.

FIG. 14 is a horizontal cross-sectional view of a slot 12 part of a stator of the fourth embodiment.

In the fourth embodiment, as in FIG. 14, in at least one slot 12 of the stator core 10, from the outer side to the inner side of the radial direction of the stator core 10, first linear part 72Pa (1) of second coil segment 72, second linear part 25Qa (43) of fifth coil segment 25, first linear part 25Pa (1) of fifth coil segment 25, second linear part 26Qa (43) of sixth coil segment 26, first linear part 26Pa (1) of sixth coil segment 26, second linear part 27Qa (43) of seventh coil segment 27, first linear part 27Pa (1) of seventh coil segment 27, and first linear part 27Pa (1) of third coil segment 23 are arranged.

Especially, in the outermost area in the radial direction of the stator core 10, the first linear part 72Pa (1) of second coil segment 72 is arranged such that a pair of short sides in the cross-section faces the radial direction. The second coil segment 72 is arranged such that the long side surface 72M of the first linear part 72Pa faces the circumferential direction of the stator core 10. The second coil segment 72 is shaped similarly to the second coil segment 22. The above-described structure applies to the first coil segment (not shown) adjacent to the second coil segment 72 in the circumferential direction of the stator core 10.

With the above structure, the short side surface side of the first linear part 72Pa (1) of the second coil segment 72 is arranged in the radial direction of the stator core 10 of the slot 12, and thus, a gap between the slot 12 and the first linear part 72Pa of the second coil segment 72 in the horizontal width (circumferential direction of the stator core 10) can be widened. Thus, when a plurality of coil segments are inserted in the inner part of the insulating paper 29 after the insulating paper 29 of FIG. 1 is disposed to be along the inner surface of the slot 12, a room can be formed in the space of the inner part of the insulating paper 29 is maintained, and the interference with the second coil segment 72 can be prevented. The above-described structure is similarly applied to the first coil segment.

Thus, the first linear part 72Pa (1) of the second coil segment 72 is especially inserted in the slot 12, and the manufacturing performance of the stator core 110 can be increased.

Fifth Embodiment

Figure 15:
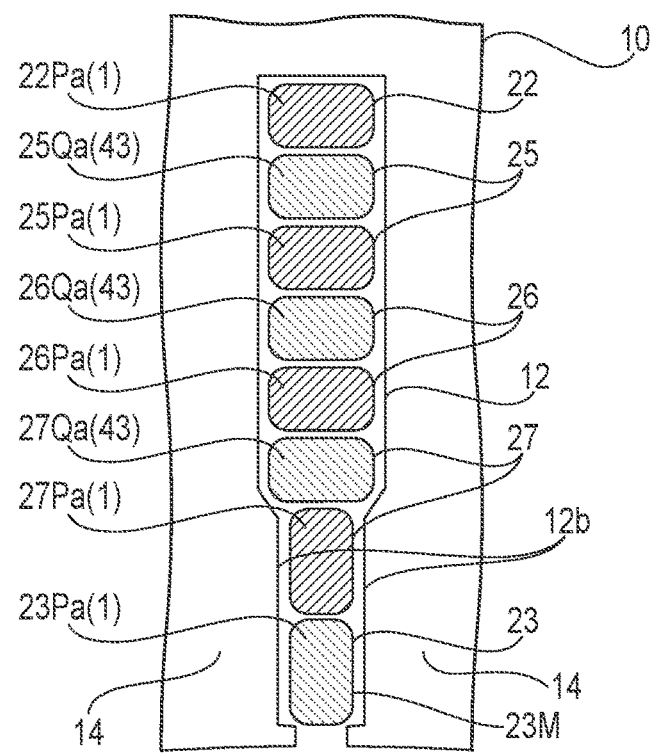
FIG. 15 is a horizontal cross-sectional view of a slot part of a stator of a fifth embodiment.

With reference to FIG. 15, the shape of slots 12 will be explained.

The fifth embodiment is a variation of the first to fourth embodiments.

FIG. 15 is a horizontal cross-sectional view of a slot 12 part of a stator of the fifth embodiment.

In the fifth embodiment, as in FIG. 15, at least one slot 12 includes side surfaces which become parallel to each other in the relatively inner side of the radial direction of the stator core 10 (step parts 12b). In other words, of the teeth 14, first tooth 14 and second tooth 14 adjacent to each other in the circumferential direction of the stator core 10 each include side surfaces which become parallel to each other in the inner side of the radial direction of the stator core 10 (step parts 12b). In at least one slot 12 of the stator core 10, from the outer side to the inner side of the radial direction of the stator core 10, first linear part 22Pa (1) of second coil segment 22, second linear part 25Qa (43) of fifth coil segment 25, first linear part 25Pa (1) of fifth coil segment 25, second linear part 26Qa (43) of sixth coil segment 26, first linear part 26Pa (1) of sixth coil segment 26, second linear part 27Qa (43) of seventh coil segment 27, first linear part 27Pa (1) of seventh coil segment 27, and first linear part 27Pa (1) of third coil segment 23 are arranged.

Especially, in the innermost area in the radial direction of the stator core 10 of slot 12, the long side surface 23M of the first linear part 23Pa (1) of third coil segment 23 is arranged to be approximately parallel to the step part 12b of the slot 12 with a slight gap. To form such a structure, in the inner surface of the slot 12, the step part 12b width of which in the circumferential direction of the stator core 10 is relatively narrowed is disposed. The step part 12b is narrower than the other parts of slot 12 in the radial direction. The above-mentioned structure is applied similarly to the first linear part 27Pa of the seventh coil segment 27.

With the above structure, in the step part 12b of slot 12, movement (oscillation) of the third coil segment 23 and the seventh coil segment 27 can be suppressed. Since the side surfaces (step parts 12b) parallel to each other are provided with the slot 12, a gap between the coil segment and the slot 12 can be equal can be equal from the outer side to the inner side of the radial direction of the stator core 10. That is, oscillation of the coil segment in the circumferential direction of the stator core 10 in the part of the outer side of the radial direction with a relatively greater gap with the slot 12 about the inner side in the radial direction with a relatively smaller gap with the slot 12. Thus, in the step parts 12b of the slot 12, damage to the insulating paper 29 because of friction of the third coil segment 23 and the seventh coil segment 27 with the insulating paper 29 of FIG. 1 can be prevented, and the insulative performance of the coil segment can be maintained.

Thus, with the first linear part 23Pa (1) of the third coil segment 23 and the first linear part 27Pa (1) of the seventh coil segment can increase the credibility of the stator core 110 with respect to the oscillation caused by the input current, rotation of the rotor 120, and external input.

While certain embodiments have been described, these embodiments have been presented by way of example only, and are not intended to limit the scope of the inventions. Indeed, the novel embodiments described herein may be embodied in a variety of other forms;

furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the number of wounded coils, and the number of coil segments to be arranged are not limited to the examples of the above-described embodiment, and can be increased/decreased arbitrarily. The rotor and the rotary electric machine of the present embodiment may be applied, in addition to the permanent magnet field electric machine, a winding field rotary electric machine, and an induction field rotary electric machine. The size, material, and shape of the rotor are not limited to the examples of the above-described embodiment, and can be changed based on the design.

Specifically, for example, instead of the structure in which eight coil segments are disposed in each slot 12 of the stator core 10, six or less coil segments, or ten or more coil segments may be disposed in each slot.

Furthermore, in the present embodiment, the first coil segment 21 and the second coil segment 22 positioned in lane 1 (outermost peripheral lane) of slot 12, and the third coil segment 23 and the fourth coil segment 24 positioned in lane 8 (innermost peripheral lane) of slot 12 do not cross each other in the radial direction of the stator core 10. That is, in the lanes 1 and 8 of slot 12, the coil segments adjacent to each other in the circumferential direction of the stator core 10 (first coil segment 21, second coil segment 22, third coil segment 23, and fourth coil segment 24) do not cross each other. On the other hand, the fifth coil segments 25, sixth coil segments 26, and seventh coil segments 27 adjacent to each other in the circumferential direction of the stator core 10 cross each other in the radial direction of the stator core 10. That is, the coil segments adjacent to each other in the circumferential direction of the stator core 10 (fifth coil segments, sixth coil segments, and seventh coil segments) cross each other. Instead of the present embodiment, for example, coil segment positioned in the lanes 1 and 2 of slot 12 to be adjacent to each other in the circumferential direction of the stator core 10, coil segments positioned in the lanes 3 and 4 to be adjacent to each other, coil segments positioned in the lanes 5 and 6 to be adjacent to each other, and coil segments positioned in the lanes 7 and 8 to be adjacent to each other may cross each other in the radial direction of the stator core 10. That is, all coil segments adjacent to each other in the circumferential direction of the stator core 10 may be arranged to cross each other.

What is claimed is:

1. A stator of a rotary electric machine, comprising:
a stator core including a yoke and a plurality of teeth; and
a plurality of rectangular conductors having a rectangular cross-section, wherein
the rectangular conductor has a linear part passing through a slot formed between adjacent teeth, and
a width of the slot is formed to be narrower to an inner side from an outer side of a radial direction of the stator core, and
in at least one of the slot, the linear part of a first rectangular conductor of the rectangular conductors, which is positioned innermost in the radial direction and in which a pair of short sides in the cross-section face in the radial direction, and the linear part of a second rectangular conductor of the rectangular conductors, which is positioned outer side of the radial direction than is the linear part of the first rectangular conductor and in which a pair of long sides in the cross-section face in the radial direction, are disposed, and
the first rectangular conductor includes, in a part drawn from the slot, a bending part extending from the linear part to be bent toward a circumferential direction of the stator core, and does not have a twisted part twisted about the circumferential direction in the part drawn from the slot, and
the second rectangular conductor includes, in a part drawn from the slot, the bending part extending from the linear part to be bent toward the circumferential direction, and a twisted part extending from the bending part to be twisted about the circumferential direction, and
the rectangular conductor is formed of a plurality of coil segments having the linear part arranged in the slot and a bridge part connecting the linear part between different slots, which are connected together,
in each coil segment, the linear part includes a first linear part and a second linear part arranged in different slots,
the first linear part and the second linear part of a first coil segment are arranged in the innermost part of the different slots in the radial direction,
the first linear part and the second linear part of a second coil segment are, as being on the both sides of the first linear part and the second linear part of the first coil segment in the circumferential direction, arranged in the innermost part of the slots in the radial direction, which is different from the slots to which the first coil segment is inserted, and
at least one of the first coil segment and the second coil segment is included in the first rectangular conductor.

2. The stator of claim 1, wherein
the first coil segment includes the first linear part and the second linear part having short sides facing the radial direction, and two bending parts in a part between different inserted slots, and
the second coil segment include the first linear part and the second linear part having short sides facing the radial direction, and two bending parts in a part between different inserted slots.

3. The stator of claim 1, wherein
the first coil segment includes the first linear part and the second linear part having short sides facing the radial direction, and two bending parts and two twisted parts in a part between different inserted slots, and
the second coil segment includes the first linear part and the second linear part having short sides facing the radial direction, and two bending parts in a part between different inserted slots.

4. The stator of claim 1, wherein
the first coil segment includes the first linear part and the second linear part having short sides facing the radial direction, and two bending parts and two twisted parts in a part between different inserted slots, and
the second coil segment includes the first linear part having short sides facing the radial direction and the second linear part facing the radial direction in the long side, and two bending parts and one twisted part in a part between different inserted slots.

5. The stator of claim 1, wherein, in at least one slot, the linear part which is positioned in the outermost of the radial direction and in which a pair of the short sides in the cross-section face the radial direction is disposed.

6. The stator of claim 1, wherein said at least one slot has a side surfaces which are parallel to each other in the inner side of the radial direction, and
the long side of the linear part is disposed to be opposed to the side surface.

7. A rotary electric machine comprising:
a stator of claim 1, and
a rotor disposed in a field space of the stator.

8. A stator of a rotary electric machine, comprising:
a stator core including a yoke and a plurality of teeth; and
a plurality of rectangular conductors having a rectangular cross-section, wherein
the rectangular conductor has a linear part passing through a slot formed between adjacent teeth, and
a width of the slot is formed to be narrower to an inner side from an outer side of a radial direction of the stator core, and
in at least one of the slot, the linear part of a first rectangular conductor of the rectangular conductors, which is positioned innermost in the radial direction and in which a pair of short sides in the cross-section face in the radial direction, and the linear part of a second rectangular conductor of the rectangular conductors, which is positioned outer side of the radial direction than is the linear part of the first rectangular conductor and in which a pair of long sides in the cross-section face in the radial direction, are disposed, and
the first rectangular conductor includes, in a part drawn from the slot, a bending part extending from the linear part to be bent toward a circumferential direction of the stator core, and does not have a twisted part twisted about the circumferential direction in the part drawn from the slot, and the second rectangular conductor includes, in a part drawn from the slot, the bending part extending from the linear part to be bent toward the circumferential direction, and a twisted part extending from the bending part to be twisted about the circumferential direction, and in at least one slot, the linear part which is positioned in the outermost of the radial direction and in which a pair of the short sides in the cross-section face the radial direction is disposed.

* * * * *